United States Patent
Vajapeyam et al.

(10) Patent No.: US 9,414,430 B2
(45) Date of Patent: Aug. 9, 2016

(54) TECHNIQUES FOR MANAGING RADIO LINK FAILURE RECOVERY FOR A USER EQUIPMENT CONNECTED TO A WWAN AND A WLAN

(71) Applicant: QUALCOMM Incorporated, San Diego, CA (US)

(72) Inventors: Madhavan Srinivasan Vajapeyam, San Diego, CA (US); Gavin Bernard Horn, La Jolla, CA (US); Ajay Gupta, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 124 days.

(21) Appl. No.: 14/447,331

(22) Filed: Jul. 30, 2014

(65) Prior Publication Data

US 2015/0049707 A1    Feb. 19, 2015

Related U.S. Application Data

(60) Provisional application No. 61/866,862, filed on Aug. 16, 2013.

(51) Int. Cl.
*G01R 31/08* (2006.01)
*H04W 76/04* (2009.01)
(Continued)

(52) U.S. Cl.
CPC ............ *H04W 76/045* (2013.01); *H04W 24/10* (2013.01); *H04W 36/22* (2013.01); *H04W 76/026* (2013.01); *H04W 76/028* (2013.01); *H04W 76/064* (2013.01); *H04W 88/06* (2013.01)

(58) Field of Classification Search
None
See application file for complete search history.

(56) References Cited

U.S. PATENT DOCUMENTS

2011/0268085 A1    11/2011   Barany et al.
2012/0140743 A1*   6/2012    Pelletier ............ H04W 72/0453
                                                             370/335
(Continued)

FOREIGN PATENT DOCUMENTS

EP           2 704 481 A1      3/2014
WO    WO-2012/139798 A1      10/2012
(Continued)

OTHER PUBLICATIONS

"3rd Generation Partnership Project; Technical Specification Group Radio Access Network; Evolved Universal Terrestrial Radio Access (E-UTRA); Study on Small Cell Enhancements for E-UTRA and E-UTRAN—Higher layer aspects (Release)", 3GPP Draft; 36842-020, 3rd Generation Partnership Project (3GPP), Mobile Competence Centre ; 650, Route Des Lucioles ; F-06921 Sophia-Antipolis Cedex ; France Jun. 2, 2013, XP050700325, Retrieved from the Internet: URL:http://www.3gpp.org/ftp/tsg_ran/WG2_RL2/TSGR2_82/Docs/.
(Continued)

*Primary Examiner* — Duc C Ho
(74) *Attorney, Agent, or Firm* — Arent Fox LLP

(57) ABSTRACT

Certain aspects of the present disclosure relate to techniques for managing radio link failure recovery for a user equipment (UE) connected to a WWAN and a WLAN. The techniques may include establishing communication with a first radio access technology (RAT) and a second RAT. At least one data flow may be transmitted over each of the first RAT and the second RAT. Determinations may be made as to whether to maintain the at least one data flow over the second RAT when a radio link failure (RLF) is detected at the UE and/or whether to resume the at least one data flow over the second RAT upon RLF recovery. The determinations may be made at the UE, at a network entity in communication with the UE, or some combination thereof.

38 Claims, 17 Drawing Sheets

(51) Int. Cl.
  *H04W 24/10* (2009.01)
  *H04W 36/22* (2009.01)
  *H04W 76/02* (2009.01)
  *H04W 76/06* (2009.01)
  *H04W 88/06* (2009.01)

(56) References Cited

U.S. PATENT DOCUMENTS

| | | | | |
|---|---|---|---|---|
| 2013/0083783 A1* | 4/2013 | Gupta | ................... | H04W 4/005 370/338 |
| 2013/0242716 A1 | 9/2013 | Amerga et al. | | |
| 2013/0308539 A1 | 11/2013 | Wu | | |
| 2014/0153489 A1* | 6/2014 | Perras | ................... | H04W 60/00 370/328 |
| 2015/0264738 A1* | 9/2015 | Lee | ................ | H04W 24/04 370/228 |

FOREIGN PATENT DOCUMENTS

| | | |
|---|---|---|
| WO | WO-2012/163260 A1 | 12/2012 |
| WO | WO-2013/144614 A1 | 10/2013 |
| WO | WO-2013/163814 A1 | 11/2013 |

OTHER PUBLICATIONS

Catt, et al., "RLM considerations for dual connectivity", 3GPP Draft; R2-130982 RLM Considerations for Dual Connectivity, 3rd Generation Partnership Project (3GPP), Mobile Competence Centre ; 650, Route Des Lucioles ; F-06921 Sophia-Antipolis Cedex ; France vol. RAN WG2, no. Chicago, US Apr. 5, 2013, XP050699195, Retrieved from the Internet: URL:http://www.3gpp.org/ftp/tsg_ran/WG2_RL2/TSGR2_81bis/Docs/.

International Search Report and Written Opinion—PCT/US2014/049128—ISA/EPO—Feb. 2, 2015. (15 total pages).

Kyocera: "Mobility and Reselection issues with CP architectures", 3GPP Draft; R2-132480 3GPP Small Cell, 3rd Generation Partnership Project (3GPP), Mobile 2013 Competence Centre ; 650, Route Des Lucioles ; F-06921 Sophia-Antipolis Cedex ; France vol. RAN WG2, no. Barcelona, Spain; Aug. 19, 2013-Aug. 23, 2013 Aug. 10, 2013, XP050718410, Retrieved from the Internet: URL:http://www.3gpp.org/ftp/tsg_ran/WG2_RL2/TSGR2_83/Docs/.

* cited by examiner

TECHNIQUES FOR MANAGING RADIO LINK FAILURE RECOVERY FOR A USER EQUIPMENT CONNECTED TO A WWAN AND A WLAN

CROSS REFERENCE TO RELATED APPLICATION

The present application for patent claims priority to Provisional Application No. 61/866,862 entitled "Techniques for Managing Radio Link Failure Recovery for a User Equipment Connected to a WWAN and WLAN" filed Aug. 16, 2013, and assigned to the assignee hereof and hereby expressly incorporated by reference herein.

BACKGROUND

Aspects of the present disclosure relate generally to wireless communications, and more particularly, to techniques for managing radio link failure (RLF) recovery for a user equipment (UE) connected to both a wireless wide area network (WWAN) and a Wireless Local Area Network (WLAN).

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of enhanced Node Bs (also referred to as eNodeBs or eNBs) that can support communication for a number of user equipments (UEs). A UE may communicate with an eNodeB via the downlink and uplink. The downlink (or forward link) refers to the communication link from the eNodeB to the UE, and the uplink (or reverse link) refers to the communication link from the UE to the eNodeB.

A key enhancement being introduced into the current 3rd Generation Partnership Project (3GPP) family of specifications (or standards) is dual connectivity for a UE with both a wireless wide area network (WWAN) (e.g., Long Term Evolution (LTE) or Universal Mobile Telecommunications System (UMTS)) and a wireless local area network (WLAN) (e.g., Wi-Fi). As such, a UE may be in communication with both an eNodeB and a WLAN access point (AP).

Given this dual connectivity, WWAN congestion can be alleviated by sending data traffic over the WLAN (e.g., offloading from LTE to WLAN) to improve overall system capacity. To this end, Radio Access Network (RAN)-based traffic aggregation between the cellular RAN and the WLAN is being introduced into the 3GPP family of standards. In this approach, Radio Resource Controller (RRC) commands signaled by the cellular RAN are used to offload traffic to the WLAN (e.g., when the cellular RAN is congested) or to steer it back (e.g., fallback) to the cellular RAN (e.g., if the WLAN radio conditions become poor and/or cellular congestion has abated).

When a radio frequency (RF) environment between the UE and a WWAN access node (e.g., eNodeB in LTE) becomes poor, the UE may enter Radio Link Failure (RLF). Generally, when LTE RLF occurs, the RRC connection for a UE is suspended until the UE recovers from RLF (e.g., completes RLF recovery processing). As such, some LTE Signaling Radio Bearers (e.g., SRB 1) are not available during this time. Furthermore, all data traffic, which also may be referred to as data flows (e.g., data radio bearers (DRB) for LTE) for the WWAN are suspended and WLAN reporting entries in RRC are cleared by the UE. For a UE that is in communication with both an eNodeB and a WLAN access point, although the operations between LTE and WLAN are independent, the LTE RLF can have a serious impact on cellular RAN-based WLAN interworking since (1) any WLAN offloading and/or fallback decisions are performed by the cellular RAN, and (2) WLAN measurement reporting from the UE is performed via RRC messages.

Currently under the 3GPP family of standards, LTE RLF processing includes three aspects: (a) RLF detection, (b) Cell Reselection, and (c) RRC Connection Reestablishment. None of these aspects, however, include guidance on how to handle WLAN data flows during recovery from LTE RLF. In view of the foregoing, it may be understood that there may be significant problems and shortcomings associated with current RLF processing when a UE is interworking between LTE and WLAN.

As such, improvements in managing RLF recovery for a UE connected to both cellular and WLAN networks are desired.

SUMMARY OF THE DISCLOSURE

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, an example method for managing a radio link failure recovery is described. The method may include establishing communication with a first radio access technology and a second radio access technology. Additionally, the method may include transmitting at least one data flow over the first radio access technology and at least one data flow over the second radio access technology. The method may further include detecting a radio link failure between a user equipment and the first radio access technology. Furthermore, the method may include determining whether to maintain the at least one data flow over the second radio access technology when the radio link failure is detected.

In an aspect, a computer-readable medium for managing a radio link failure recovery is described. The computer readable medium may store computer-executable code that may cause at least one computer to establish communication with a first radio access technology and a second radio access technology. In addition, the code may cause at least one computer to transmit at least one data flow over the first radio access technology and at least one data flow over the second radio access technology. Furthermore, the code may cause at least one computer to detect a radio link failure between a user equipment and the first radio access technology. The code may additionally cause at least one computer to determine whether to maintain the at least one data flow over the second radio access technology when the radio link failure is detected.

In an aspect, an example apparatus for managing a radio link failure recovery is described by the present disclosure. The apparatus may include means for establishing communication with a first radio access technology and a second radio access technology. The apparatus may include means for transmitting at least one data flow over the first radio access technology and at least one data flow over the second radio access technology. The apparatus may include means for detecting a radio link failure between a user equipment and the first radio access technology. The apparatus may include means for determining whether to maintain the at least one data flow over the second radio access technology when the radio link failure is detected.

In an aspect, an apparatus for managing a radio link failure recovery is described. The apparatus may include a controller configured to establish communication with a first radio access technology and a second radio access technology. The apparatus may include a wireless wide area network (WWAN) radio configured to transmit at least one data flow over the first radio access technology. The apparatus may include a wireless local area network (WLAN) radio configured to transmit at least one data flow over the second radio access technology. The apparatus may include a radio link failure (RLF) component configured to detect a radio link failure between a user equipment and the first radio access technology. The apparatus may include an RLF data flow determination component configured to determine whether to maintain the at least one data flow over the second radio access technology when the radio link failure is detected.

In an aspect, a method for managing a radio link failure recovery is described. The method may include establishing a first communication connection with a user equipment via a first radio access technology. The method may include receiving an indication that a second communication connection is established with the user equipment via a second radio access technology. The second communication connection may transmit at least one data flow. The method may include receiving a radio link failure recovery indication of the first communication connection from the user equipment. The method may include determining whether the at least one data flow can be maintained over the second communication connection via the second radio access technology during a radio link failure. The method may include indicating to the user equipment whether to maintain the transmission of the at least one data flow, on a per-data flow basis, over the second communication connection via the second radio access technology.

In an aspect, a computer-readable medium for managing a radio link failure recovery is described. The computer-readable medium may store computer-executable code. The code may cause at least one computer to establish a first communication connection with a user equipment via a first radio access technology. The code may cause at least one computer to receive an indication that a second communication connection is established with the user equipment via a second radio access technology. The second communication connection may transmit at least one data flow. The code may cause at least one computer to receive a radio link failure recovery indication of the first communication connection from the user equipment. The code may cause at least one computer to determine whether the at least one data flow can be maintained over the second communication connection via the second radio access technology during a radio link failure. The code may cause at least one computer to indicate to the user equipment whether to maintain the transmission of the at least one data flow, on a per-data flow basis, over the second communication connection via the second radio access technology.

In an aspect, an apparatus for managing a radio link failure recovery is described. The apparatus may include means for establishing a first communication connection with a user equipment via a first radio access technology. The apparatus may include means for receiving an indication that a second communication connection is established with the user equipment via a second radio access technology. The second communication connection may transmit at least one data flow. The apparatus may include means for receiving a radio link failure recovery indication of the first communication connection from the user equipment. The apparatus may include means for determining whether the at least one data flow can be maintained over the second communication connection via the second radio access technology during a radio link failure. The apparatus may include means for indicating to the user equipment whether to maintain the transmission of the at least one data flow, on a per-data flow basis, over the second communication connection via the second radio access technology.

In an aspect, an apparatus for managing a radio link failure recovery is described. The apparatus may include at least one memory and an RLF data flow configuration component, in communication with the at least one memory. The RLF data flow configuration component may be configured to establish a first communication connection with a user equipment via a first radio access technology. The RLF Data flow configuration component may be configured to receive an indication that a second communication connection is established with the user equipment via a second radio access technology, wherein the second communication connection transmits at least one data flow. The RLF data flow configuration component may be configured to receive a radio link failure recovery indication of the first communication connection from the user equipment. The RLF data flow configuration component may be configured to determine whether the at least one data flow can be maintained over the second communication connection via the second radio access technology during a radio link failure. The RLF data flow configuration component may be configured to indicate to the user equipment whether to maintain the transmission of the at least one data flow, on a per-data flow basis, over the second communication connection via the second radio access technology.

In an aspect, a method for managing a radio link failure recovery is described. The method may include receiving, from a user equipment, a radio link failure recovery indication for a first communication connection. The method may include receiving an indication that a second communication connection is established with the user equipment via a second radio access technology. The second communication connection may be associated with at least one data flow. The method may include determining whether the at least one data flow can be resumed over the second communication connection via the second radio access technology after the radio link failure recovery. The method may include indicating to the user equipment whether to resume the transmission of the at least one data flow over the second communication connection via the second radio access technology.

In an aspect, a computer-readable medium for managing a radio link failure recovery is described. The computer-readable medium may store computer-executable code. The code may cause at least one computer to receive, from a user equipment, a radio link failure recovery indication for a first communication connection. The code may cause at least one computer to receive an indication that a second communication connection is established with the user equipment via a second radio access technology. The second communication connection may be associated with at least one data flow. The code may cause at least one computer to determine whether the at least one data flow can be resumed over the second communication connection via the second radio access technology after the radio link failure recovery. The code may cause at least one computer to indicate to the user equipment whether to resume the transmission of the at least one data flow over the second communication connection via the second radio access technology.

In an aspect, an apparatus for managing a radio link failure recovery is described. The apparatus may include means for receiving, from a user equipment, a radio link failure recovery indication for a first communication connection. The apparatus may include means for receiving an indication that a second communication connection is established with the user equipment via a second radio access technology. The second communication connection may be associated with at least one data flow. The apparatus may include means for determining whether the at least one data flow can be resumed over the second communication connection via the second radio access technology after the radio link failure recovery. The apparatus may include means for indicating to the user equipment whether to resume the transmission of the at least one data flow over the second communication connection via the second radio access technology.

In an aspect, an apparatus for managing a radio link failure recovery is described. The apparatus may include at least one memory and an RLF data flow configuration component in communication with the at least one memory. The RLF data flow configuration component may be configured to receive, from a user equipment, a radio link failure recovery indication for a first communication connection. The RLF data flow configuration component may be configured to receive an indication that a second communication connection is established with the user equipment via a second radio access technology. The second communication connection may be associated with at least one data flow. The RLF data flow configuration component may be configured to determine whether the at least one data flow can be resumed over the second communication connection via the second radio access technology after the radio link failure recovery. The RLF data flow configuration component may be configured to indicate to the user equipment whether to resume the transmission of the at least one data flow over the second communication connection via the second radio access technology.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION

Figure 1:
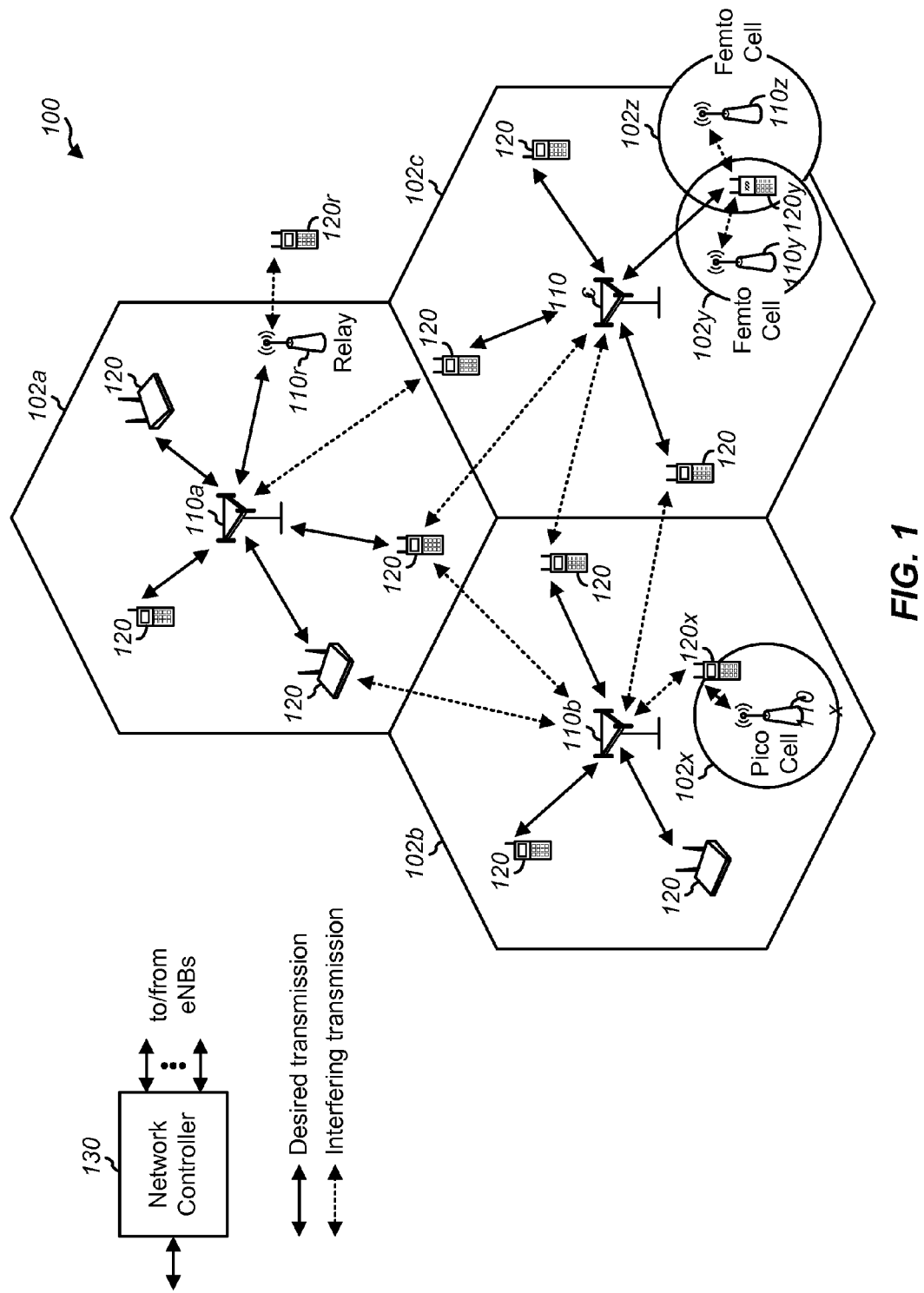
FIG. 1 is a block diagram conceptually illustrating an example of a telecommunications system having aspects configured to manage radio link failure recovery for a user equipment as described herein.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

According to the present aspects, apparatus and methods are presented that provide new techniques for managing radio link failure (RLF) recovery at a user equipment (UE) connected to both a wireless wide area network (WWAN), such as, for example, Long Term Evolution (LTE) or Universal Mobile Telecommunications System (UMTS), and a Wireless Local Area Network (e.g., a Wi-Fi network). More particularly, various aspects are described for handling WLAN data flows throughout the RLF detection and recovery processes.

Table 1 summarizes the various aspects of techniques described herein for managing data flows during RLF recovery. With regard to RLF behavior, in all aspects, WWAN (e.g., LTE) data flows (which also may be referred to as Data Radio Bearers (DRB)) are suspended or stopped. Several of the aspects (e.g., the second and third aspects) include suspending both cellular (e.g., LTE) and WLAN data flows. Further, some aspects (e.g., the first, fourth, and fifth aspects) include optionally suspending WLAN data flows, along with cellular (e.g., LTE) data flows. The sixth aspect includes suspending only cellular (e.g., LTE) data flows. Additionally, Table 1 summarizes actions associated with the RLF recovery for each aspect.

TABLE 1

Alternatives for WLAN data flow handling upon LTE RLF

| Aspect | RLF behavior | RLF recovery |
| --- | --- | --- |
| 1 | Stop SRB1 and stop LTE (or LTE & WLAN) data flows | Retain data flow mapping before RLF |
| 2 | Stop SRB1 and stop all data flows | Network decides whether to restart WLAN interworking based on measurement report from UE |
| 3 | Stop SRB1 and stop all data flows | Similar to second aspect, except WLAN is reported during the connection reestablishment procedure |
| 4 | Stop SRB1 and stop LTE (or LTE & WLAN) data flows | UE decides whether to revert to the previous state or fall back to LTE (decision is indicated to the RAN) |
| 5 | Stop SRB1 and stop LTE (or LTE & WLAN) data flows | Similar to fourth aspect, but network configures UE behavior instead of UE deciding |
| 6 | Stop LTE data flows only | SRB1 is sent over WLAN (LTE data flow can be moved to WLAN during RLF) |

A data flow may correspond to any transmission of data between two network entities, such as, for example, a UE and an eNodeB or a UE and a WLAN access point (AP). A data flow also may be referred to, for example, as data traffic, traffic, and/or a data path. A WWAN data flow may include or be associated with a bearer, a traffic flow template (TFT), a transmission control protocol (TCP) connection, and/or a quality of service (QoS) class, for example. A WLAN data flow may include or be associated with a Request-to-Send (RTS), Clear-to-Send (CTS), other signaling, and/or user data, for example.

The various aspects described herein may be described with respect to LTE as an example of a WWAN to which a UE is in communication. However, it will be understood that at least some of the present aspects may be applied to other WWANs, including UMTS, and/or other radio access technologies (RAT).

FIG. 1 is a block diagram conceptually illustrating an example of a telecommunications system 100 having aspects included therein configured to manage WWAN (e.g., LTE) radio link failure (RLF) in accordance with the present aspects. For example, the telecommunications system 100 may be an LTE network or a UMTS network. The telecommunications system 100 may include a number of evolved NodeBs (eNodeBs) 110, user equipment (UEs) 120 and other network entities. An eNodeB 110 may be a station that communicates with the UEs 120 to provide access to a WWAN and may also be referred to as a base station, an access point, etc. A Node B is another example of a station that communicates with the UEs 120. Although not shown, one or more WLAN (or Wi-Fi) AP also may be in communication with the UEs 120 to provide access to a Wireless Local Area Network (WLAN) or some other type of local area network (LAN).

Each eNodeB 110 may provide communication coverage for a particular geographic area. In 3GPP, the term "cell" can refer to a coverage area of an eNodeB 110 and/or an eNodeB subsystem serving the coverage area, depending on the context in which the term is used.

An eNodeB 110 may provide communication coverage for a macro cell, a pico cell, a femto cell, and/or other types of cell. A macro cell may cover a relatively large geographic area (e.g., several miles or kilometers in radius) and may allow unrestricted access by UEs 120 that have a subscription to a wireless service associated with the macro cell. A pico cell may cover a relatively small geographic area and may allow unrestricted access by UEs 120 with a service subscription. A femto cell may cover a relatively small geographic area (e.g., a home) and may allow restricted access by UEs 120 having an association with the femto cell (e.g., UEs 120 may be subscribed to a Closed Subscriber Group (CSG) set up for use by one of UEs 120 in a primary location of a user of one of UEs 120, such as, for example, a home or office). An eNodeB 110 for a macro cell may be referred to as a macro eNodeB. An eNodeB 110 for a pico cell may be referred to as a pico eNodeB. An eNodeB 110 for a femto cell may be referred to as a femto eNodeB or a home eNodeB.

In the example shown in FIG. 1, the eNodeBs 110a, 110b, and 110c may be macro eNodeBs for the macro cells 102a, 102b and 102c, respectively. The eNodeB 110x may be a pico eNodeB for a pico cell 102x. The eNodeBs 110y and 110z may be femto eNodeBs for the femto cells 102y and 102z, respectively. An eNodeB 110 may provide communication coverage for one or more (e.g., three) cells.

The telecommunications system 100 may include one or more relay stations 110r and 120r, that also may be referred to as a relay eNodeB, a relay, etc. The relay station 110r may be a station that receives a transmission of data and/or other information from an upstream station (e.g., an eNodeB 110 or a UE 120) and sends the received transmission of the data and/or other information to a downstream station (e.g., a UE 120 or an eNodeB 110). The relay station 120r may be a UE that relays transmissions for other UEs (not shown). In the example shown in FIG. 1, the relay station 110r may communicate with the eNodeB 110a and the UE 120r in order to facilitate communication between the eNodeB 110a and the UE 120r.

The telecommunications system 100 may be a heterogeneous network that includes eNodeBs 110 of different types, e.g., macro eNodeBs 110a, 110b, and 110c, pico eNodeB 110x, femto eNodeBs 110y and 110z, relay station 110r and/or the like. These different types of eNodeBs 110 may have different transmit power levels, different coverage areas, and different impact on interference in the telecommunications system 100. For example, macro eNodeBs 110a, 110b, and/or 110c may have a high transmit power level (e.g., 20 Watts) whereas pico eNodeB 110x, femto eNodeBs 110y and 110z and/or relay station 110r may have a lower transmit power level (e.g., 1 Watt).

The telecommunications system 100 may support synchronous or asynchronous operation. For synchronous operation, the eNodeBs 110 may have similar frame timing, and transmissions from different eNodeBs 110 may be approximately aligned in time. For asynchronous operation, the eNodeBs 110 may have different frame timing, and transmissions from different eNodeBs 110 may not be aligned in time. The techniques described herein may be used for both synchronous and asynchronous operation.

A network controller 130 may be coupled to a set of eNodeBs 110 and provide coordination and control for the eNodeBs 110. The network controller 130 may communicate with the eNodeBs 110 via a backhaul (not shown). The eNodeBs 110 may also communicate with one another, e.g., directly or indirectly via wireless or wire line backhaul (e.g., an X2 interface) (not shown). In an aspect where telecommunications system 100 includes eNodeBs and one or more WLAN AP, these two types of access nodes may, or may not, be connected to one another via the backhaul. However, in the case where the eNodeBs and WLAN APs are not connected via the backhaul, the eNodeBs and the WLAN APs may communicate with one another through an intermediary such as, for example, one of UEs 120.

The UEs 120 may be dispersed throughout the telecommunications system 100 and each UE 120 may be stationary or mobile. UEs 120 also may be referred to as terminals, mobile stations, subscriber units, stations, etc. In an example, each of UEs 120 may be a cellular phone, a smartphone, a personal digital assistant (PDA), a wireless modem, a wireless communication device, a handheld device, a laptop computer, a cordless phone, a wireless local loop (WLL) station, a tablet, a netbook, a smart book, and/or the like. The UEs 120 may be able to communicate with macro eNodeBs 110a, 110b, and 110c, pico eNodeB 110x, femto eNodeBs 110y and 110z, relay stations 110r, and/or any other network entity. For example, in FIG. 1, a solid line with double arrows may indicate desired transmissions between a particular UE 120 and its serving eNodeB 110, which is an eNodeB 110 designated to serve the particular UE 120 on the downlink and/or uplink. A dashed line with double arrows may indicate interfering transmissions between a particular UE 120 and an eNodeB 110 (e.g., a non-serving eNodeB).

LTE telecommunication networks may utilize orthogonal frequency division multiplexing (OFDM) on the downlink and single-carrier frequency division multiplexing (SC-FDM) on the uplink. OFDM and SC-FDM may partition the system bandwidth into multiple (K) orthogonal subcarriers, which are also commonly referred to as tones, bins, etc. Each subcarrier may be modulated with data. In general, modulation symbols may be sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal Fast Fourier Transform (FFT) size may be equal to 128, 256, 512, 1024 or 2048 for a system bandwidth of 1.25, 2.5, 5, 10 or 20 megahertz (MHz), respectively. The system bandwidth may be partitioned into sub-bands. For example, a sub-band may cover 1.08 MHz (i.e., 6 resource blocks), and there may be 1, 2, 4, 8 or 16 sub-bands for system bandwidth of 1.25, 2.5, 5, 10 or 20 MHz, respectively.

Figure 2:
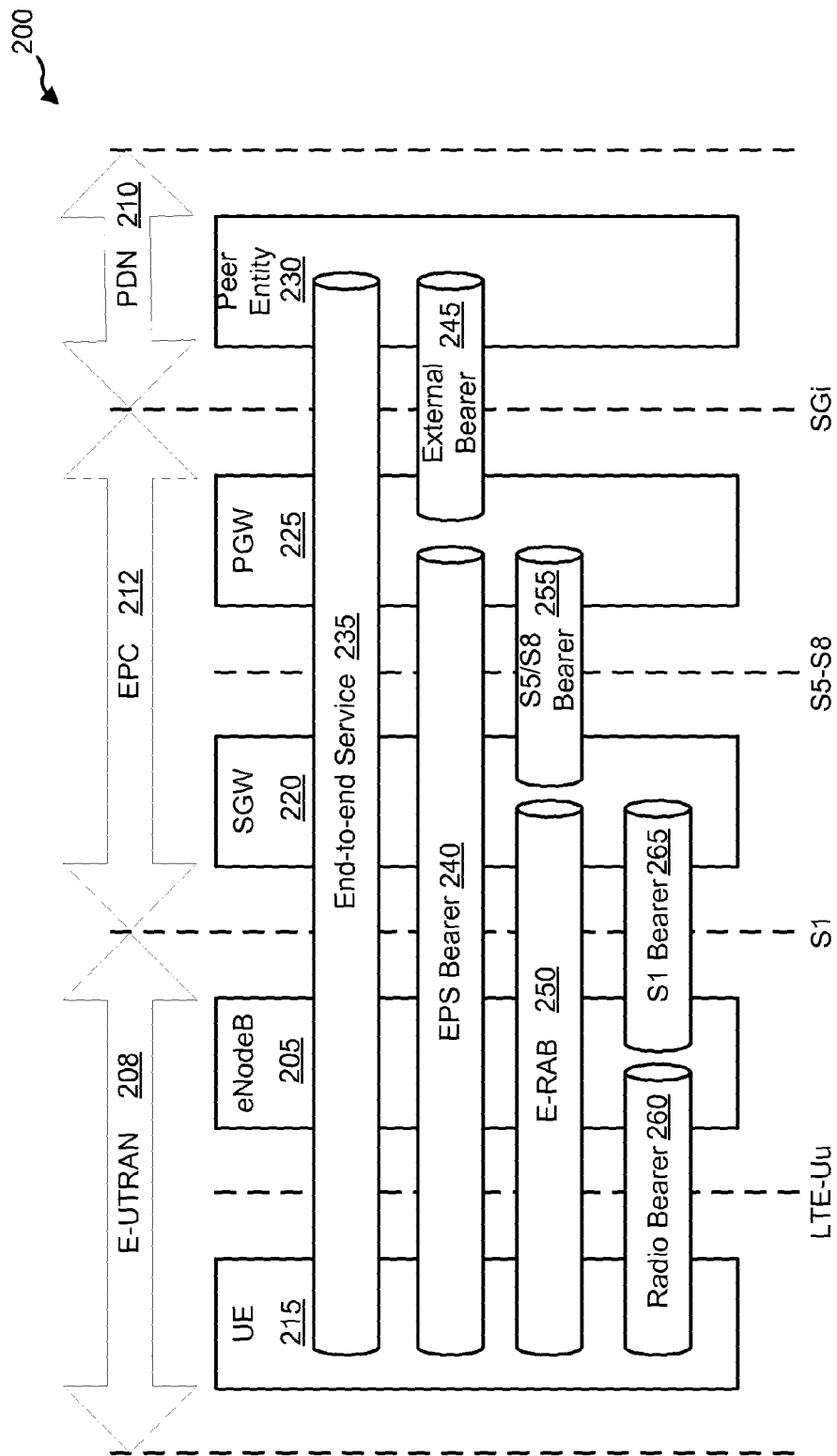
FIG. 2 is a block diagram conceptually illustrating an example of a bearer architecture in a wireless communications system having aspects configured to manage radio link failure recovery for a user equipment as described herein.

FIG. 2 is a block diagram conceptually illustrating an example of a bearer (e.g., data flow) architecture in a wireless communications system 200 having aspects configured to manage WWAN (e.g., LTE) RLF in accordance with the present aspects. The bearer architecture may be used to provide an end-to-end service 235 between a UE 215, which may be one of UEs 120 of FIG. 1, and a peer entity 230 addressable over a network. The peer entity 230 may be a server, another UE, or another type of network-addressable device. The end-to-end service 235 may forward data between UE 215 and the peer entity 230 according to a set of characteristics (e.g., quality of service (QoS)) associated with the end-to-end service 235. The end-to-end service 235 may be implemented by at least the UE 215, an eNodeB 205 (e.g., one of eNodeBs 110 of FIG. 1), a serving gateway (SGW) 220, a packet data network (PDN) gateway (PGW) 225, and the peer entity 230. The UE 215 and eNodeB 205 may be components of an evolved UMTS terrestrial radio access network (E-UTRAN) 208, which is the air interface of the LTE/LTE-A systems. The serving gateway 220 and PDN gateway 225 may be components of an evolved Packet Core (EPC) 209, which is the core network architecture of LTE/LTE-A systems. The peer entity 230 may be an addressable node on a PDN 210 communicatively coupled with the PDN gateway 225.

The end-to-end service 235 may be implemented by an evolved packet system (EPS) bearer 240 between the UE 215 and the PDN gateway 225, and by an external bearer 245 between the PDN gateway 225 and the peer entity 230 over an SGi interface. The SGi interface may expose an internet protocol (IP) or other network-layer address of the UE 215 to the PDN 210.

The EPS bearer 240 may be an end-to-end tunnel defined to a specific QoS. Each EPS bearer 240 may be associated with a plurality of parameters, for example, a QoS class identifier (QCI), an allocation and retention priority (ARP), a guaranteed bit rate (GBR), and an aggregate maximum bit rate (AMBR). The QCI may be an integer indicative of a QoS class associated with a predefined packet forwarding treatment in terms of latency, packet loss, GBR, and priority. In certain examples, the QCI may be an integer from 1 to 9. In addition, the ARP may be used by a scheduler of eNodeB 205 to provide preemption priority in the case of contention between two different bearers for the same resources. The GBR may specify separate downlink and uplink guaranteed bit rates. Certain QoS classes may be non-GBR such that no guaranteed bit rate is defined for bearers of those classes.

The EPS bearer 240 may be implemented by an E-UTRAN radio access bearer (E-RAB) 250 between the UE 215 and the serving gateway 220, and an S5/S8 bearer 255 between the serving gateway 220 and the PDN gateway over an S5 or S8 interface. S5 refers to the signaling interface between the serving gateway 220 and the PDN gateway 225 in a non-roaming scenario, and S8 refers to an analogous signaling interface between the serving gateway 220 and the PDN gateway 225 in a roaming scenario. The E-RAB 250 may be implemented by a radio bearer 260 between the UE 215 and the eNodeB 205 over an LTE-Uu air interface and by an S1 bearer 265 between the eNodeB and the serving gateway 220 over an S1 interface.

It will be understood that, while FIG. 2 illustrates the bearer hierarchy in the context of an example of end-to-end service 235 between the UE 215 and the peer entity 230, certain bearers may be used to convey data unrelated to end-to-end service 235. For example, radio bearers 260 or other types of bearers may be established to transmit control data between two or more entities where the control data is unrelated to the data of the end-to-end service 235.

As discussed above, in certain configurations, a system, such as wireless communications system 200 of FIG. 2, may include cellular (e.g., LTE) and WLAN (e.g., Wi-Fi) interworking. As such, data related to one or more EPS bearers 240 (e.g., cellular or LTE data) may be offloaded from an eNodeB 205 to a WLAN AP (not shown), thereby diverting bearer traffic away from the EPC 212 and to the PDN 210 over an alternate path. Additional aspects related to offloading and/or fallback of LTE data from the EPC 212 to PDN 210 via a WLAN AP will be described with respect to FIGS. 5A and 5B.

It will be understood that a bearer also may be referred to as a data flow. The term "bearer" is commonly used to describe LTE (or other WWAN) data flows (e.g., data radio bearers or DRBs); while data flows for other radio access technologies (RATs), such as, for example, WLAN (or Wi-Fi), are unlikely to be referred to as "bearers" and, rather, the more generic term "data flows" are used.

Figure 3:
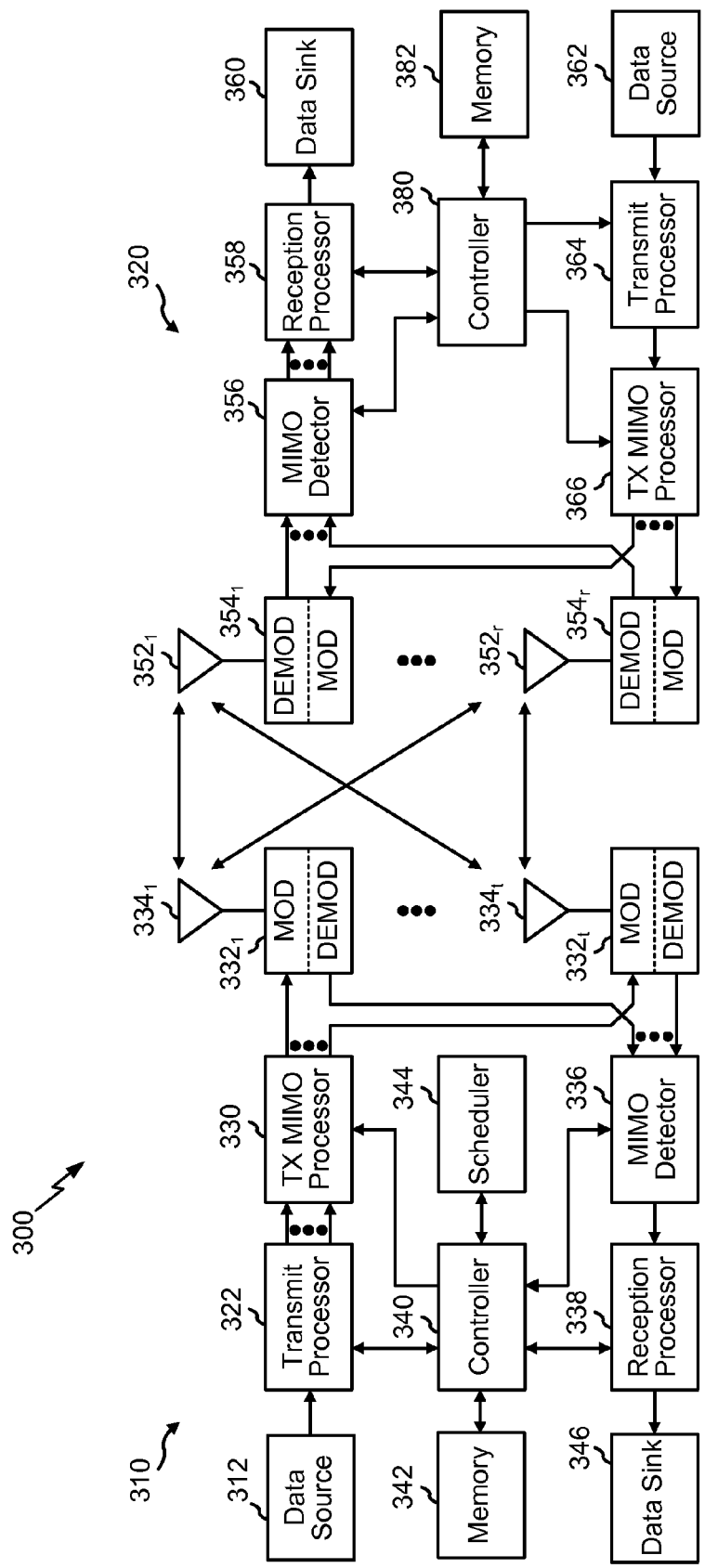
FIG. 3 is a block diagram conceptually illustrating an exemplary eNodeB and an exemplary user equipment having aspects configured to manage radio link failure recovery for a user equipment as described herein.

FIG. 3 is a block diagram conceptually illustrating an exemplary eNodeB 310 (e.g., one of eNodeBs 110 of FIG. 1 and/or eNodeB 205 of FIG. 2) and an exemplary UE 320 (e.g., one of UEs 120 of FIG. 1 and/or UE 215 of FIG. 2) having aspects configured to manage WWAN (e.g., LTE) RLF in accordance with the present aspects.

The eNodeB 310 may be equipped with antennas $334_{1-t}$, and the UE 320 may be equipped with antennas $352_{1-r}$, wherein t and r are integers greater than or equal to one. At the eNodeB 310, a base station transmit processor 322 may receive data from a base station data source 312 and control information from a base station controller 340. In an aspect, the base station controller 340 may comprise a processor and, therefore, may also be referred to as base station processor 340 or base station controller/processor 340. The control information may be carried on the PBCH, PCFICH, PHICH, PDCCH, etc. The data may be carried on the PDSCH, etc. The base station transmit processor 322 may process (e.g., encode and symbol map) the data and control information to obtain data symbols and control symbols, respectively. The base station transmit processor 322 may also generate reference symbols, e.g., for the PSS, SSS, and cell-specific reference signal (RS). A base station transmit (TX) multiple-input multiple-output (MIMO) processor 330 may perform spatial processing (e.g., precoding) on the data symbols, the control symbols, and/or the reference symbols, if applicable, and may provide output symbol streams to the base station modulators/demodulators (MODs/DEMODs) $332_{1-t}$. Each base station modulator/demodulator 332 may process a respective output symbol stream (e.g., for OFDM, etc.) to obtain an output sample stream. Each base station modulator/demodulator 332 may further process (e.g., convert to analog, amplify, filter, and upconvert) the output sample stream to obtain a downlink signal. Downlink signals from modulators/demodulators $332_{1-t}$ may be transmitted via the antennas $334_{1-t}$, respectively.

At the UE 320, the UE antennas $352_{1-r}$ may receive the downlink signals from the eNodeB 310 and may provide received signals to the UE modulators/demodulators (MODs/DEMODs) $354_{1-r}$ respectively. Each UE modulator/demodulator 354 may condition (e.g., filter, amplify, downconvert, and digitize) a respective received signal to obtain input samples. Each UE modulator/demodulator 354 may further process the input samples (e.g., for OFDM, etc.) to obtain received symbols. A UE MIMO detector 356 may obtain received symbols from all the UE modulators/demodulators $354_{1-r}$, and perform MIMO detection on the received symbols if applicable, and provide detected symbols. A UE reception processor 358 may process (e.g., demodulate, deinterleave, and decode) the detected symbols, provide decoded data for the UE 320 to a UE data sink 360, and provide decoded control information to a UE controller 380. In an aspect, the UE controller 380 may comprise a processor and, therefore, may also be referred to as UE processor 380 or UE controller/processor 380.

On the uplink, at the UE 320, a UE transmit processor 364 may receive and process data (e.g., for the PUSCH) from a UE data source 362 and control information (e.g., for the PUCCH) from the UE controller 380. The UE transmit processor 364 may also generate reference symbols for a reference signal. The symbols from the UE transmit processor 364 may be precoded by a UE TX MIMO processor 366 if applicable, further processed by the UE modulator/demodulators $354_{1-r}$ (e.g., for SC-FDM, etc.), and transmitted to the eNodeB 310. At the eNodeB 310, the uplink signals from the UE 320 may be received by the base station antennas 334, processed by the base station modulators/demodulators 332, detected by a base station MIMO detector 336 if applicable, and further processed by a base station reception processor 338 to obtain decoded data and control information sent by the UE 320. The base station reception processor 338 may provide the decoded data to a base station data sink 346 and the decoded control information to the base station controller 340.

The base station controller 340 and the UE controller 380 may direct the operation at the eNodeB 310 and the UE 320, respectively. The base station controller 340 and/or other processors and modules at the eNodeB 310 may perform or direct, e.g., the execution of various processes for the techniques described herein. The UE controller 380 and/or other processors and modules at the UE 320 may also be configured to perform or direct the execution of the functional blocks illustrated in FIG. 6, and/or other processes for the techniques described herein for managing RLF recovery for a UE that is in communication with both cellular and WLAN (or Wi-Fi) networks. The base station memory 342 and the UE memory 382 may store data and program codes for the eNodeB 310 and the UE 320, respectively. A scheduler 344 may schedule UEs 320 for data transmission on the downlink and/or uplink.

In one configuration, the UE 320 may include means for establishing communication with a first radio access technology (RAT) and a second RAT; means for transmitting at least one data flow over the first RAT and at least one data flow over the second RAT; means for detecting a radio link failure between the user equipment and the first RAT; and means for determining whether to maintain the at least one data flow over the second RAT when the radio link failure is detected. In one aspect, the aforementioned means may be the UE controller 380, the UE memory 382, the UE reception processor 358, the UE MIMO detector 356, the UE modulators/demodulators 354, and the UE antennas 352 configured to perform the functions recited by the aforementioned means. In another aspect, the aforementioned means may be a module, a component, or any apparatus configured to perform the functions recited by the aforementioned means.

In one configuration, the eNodeB 310 may include means for establishing a first communication connection with a user equipment via a first RAT; means for receiving an indication that a second communication connection is established with the user equipment via a second RAT, wherein the second communication connection transmits at least one data flow; means for receiving a radio link failure recovery indication of the first communication connection from a user equipment (e.g., UE 320), wherein communication connections between the user equipment and a local area network and between the user equipment and a WWAN have been established; means for determining whether the at least one data flow can be maintained over the second communication connection via the second RAT during a radio link failure; and means for indicating to the user equipment whether to maintain the transmission of the at least one data flow, on a per-data flow basis, over the second communication connection via the second RAT. In another configuration, eNodeB 310 may include means for receiving, from, e.g., UE 320, a radio link failure recovery indication for a first communication connection; means for receiving an indication that a second communication connection is established with the user equipment via a second RAT, wherein the second communication connection is associated with at least one data flow; means for determining whether the at least one data flow can be resumed over the second communication connection via the second RAT after the radio link failure recovery; and means for indicating to the user equipment whether to resume the transmission of the at least one data flow over the second communication connection via the second RAT. In one aspect, the aforementioned means may be the base station controller 340, the base station memory 342, the base station transmit processor 322, the base station modulators/demodulators 332, and the base station antennas 334 configured to perform the functions recited by the aforementioned means. In another aspect, the aforementioned means may be a module, a component, or any apparatus configured to perform the functions recited by the aforementioned means.

Figure 4:
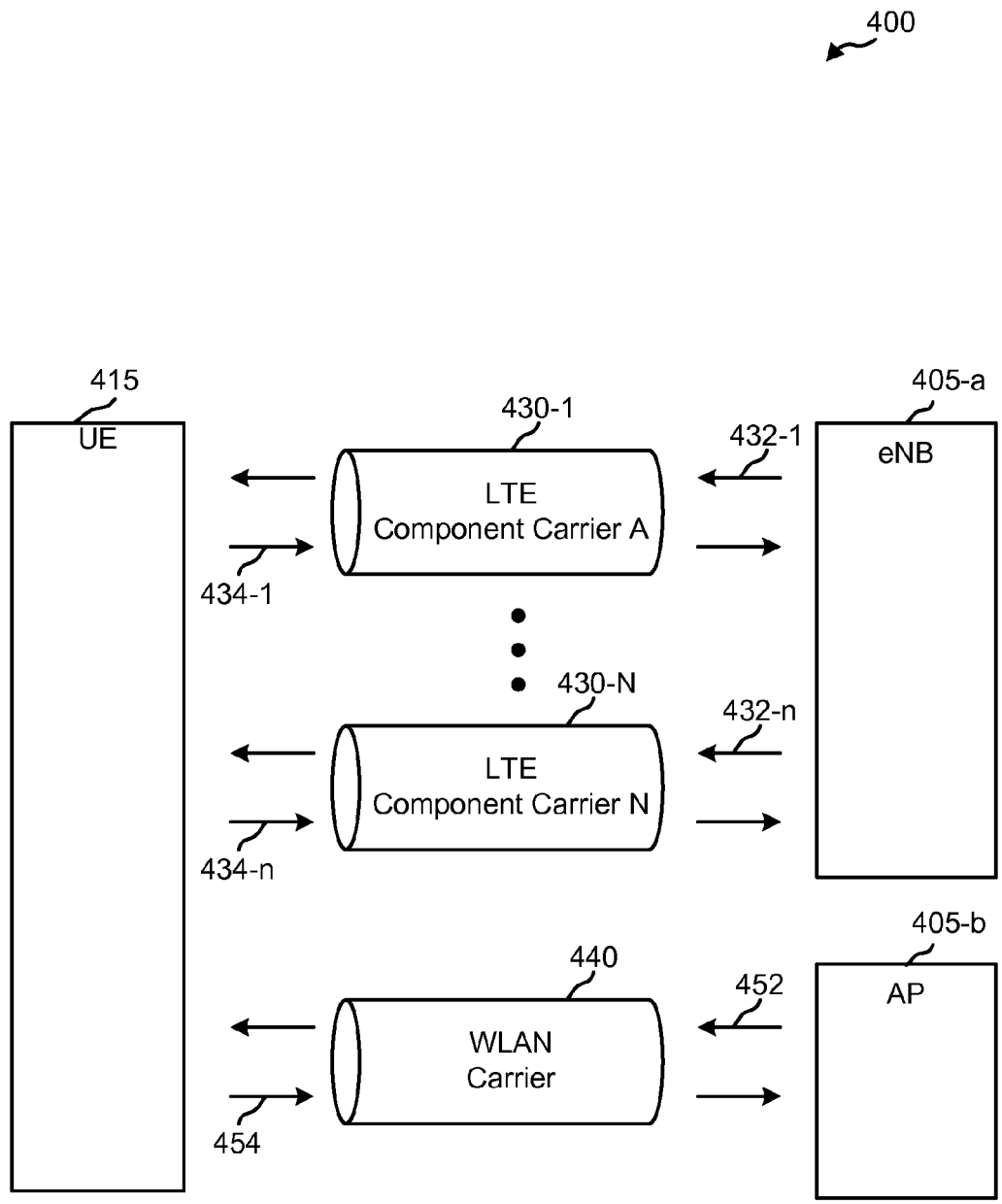
FIG. 4 is a block diagram conceptually illustrating an aggregation of LTE and WLAN radio access technologies at a user equipment having aspects configured to manage radio link failure recovery for a user equipment as described herein

FIG. 4 is a block diagram conceptually illustrating a carrier aggregation of LTE and WLAN radio access technologies (RAT) at a UE 415, where UE 415, eNodeB 405-a, and/or WLAN AP 405-b have aspects configured to manage WWAN (e.g., LTE) RLF recovery in accordance with the present aspects. The aggregation may occur in a system 400 including a multi-mode UE 415, which can communicate with an eNodeB 405-a using one or more component carriers 1 through N ($CC_1$-$CC_N$), and with a WLAN (or Wi-Fi) AP 405-b using WLAN carrier 440. The UE 415 may be an example of one or more of the UEs 120 of FIG. 1, UE 215 of FIG. 2, and UE 320 of FIG. 3. The eNodeB 405-a may be an example of one or more of the eNodeBs 110 of FIG. 1, eNodeB 205 of FIG. 2, and eNodeB 310 of FIG. 3. While only one UE 415, one eNodeB 405-a, and one WLAN AP 405-b are illustrated in FIG. 4, it will be appreciated that the system 400 can include any number of UEs 415, eNodeBs 405-a, and/or WLAN APs 405-b.

The eNodeB 405-a can transmit information to the UE 415 over forward (downlink) channels 432-1 through 432-N on LTE component carriers $CC_1$ through $CC_N$ 430. In addition, the UE 415 can transmit information to the eNodeB 405-a over reverse (uplink) channels 434-1 through 434-N on LTE component carriers $CC_1$ through $CC_N$. Similarly, the WLAN AP 405-b may transmit information to the UE 415 over forward (downlink) channel 452 on WLAN carrier 440. In addition, the UE 415 may transmit information to the WLAN AP 405-b over reverse (uplink) channel 454 of WLAN carrier 440.

In describing the various entities of FIG. 4, and for the purposes of explanation, the nomenclature associated with a 3GPP LTE or LTE-A wireless network is used. However, it is to be appreciated that the system 400 can operate in other networks such as, but not limited to, a UMTS network, an OFDMA wireless network, a CDMA network, a 3GPP2 CDMA2000 network and/or the like.

In multi-carrier operations, the downlink control information (DCI) messages associated with different UEs 415 can be carried on a plurality of component carriers. For example, the DCI on a PDCCH can be included on the same component carrier that is configured to be used by a UE 415 for PDSCH transmissions (e.g., same-carrier signaling). Alternatively, or additionally, the DCI may be carried on a component carrier different from the target component carrier used for PDSCH transmissions (e.g., cross-carrier signaling). In some embodiments, a carrier indicator field (CIF), which may be semi-statically enabled, may be included in some or all DCI formats to facilitate the transmission of PDCCH control signaling from a carrier other than the target carrier for PDSCH transmissions (e.g., cross-carrier signaling).

In the present example, the UE 415 may receive data from one eNodeB 405-a. However, users on a cell edge may experience high inter-cell interference which may limit the data rates. Multiflow allows UEs to receive data from two eNodeBs 405-a simultaneously. Multiflow works by sending and receiving data from the two eNodeBs 405-a in two totally separate streams when a UE 415 is in range of two cell towers in two adjacent cells at the same time. The UE 415 communicates with two eNodeBs 405-a simultaneously when the device is on the edge of the reach of either one of the two eNodeBs. By scheduling two independent data streams to the UE 415 from two different eNodeBs at the same time, multiflow exploits uneven loading in HSPA networks. This helps improve the cell edge user experience while increasing network capacity. In one example, throughput data speeds for users at a cell edge may double. "Multiflow" is a feature of LTE/LTE-A that is similar to dual-carrier HSPA, however, there are differences. For example, dual-carrier HSPA does not allow for connectivity to multiple towers to connect simultaneously to a device.

Previous to LTE-A standardization, LTE component carriers 430 have been backward-compatible, which enabled a smooth transition to new releases. However, this feature caused the LTE component carriers 430 to continuously transmit common reference signals (CRS, also referred to as cell-specific reference signals) in every subframe across the bandwidth. Most cell site energy consumption is caused by the power amplifier, as the cell remains on even when only limited control signaling is being transmitted, causing the amplifier to continue to consume energy. CRSs were introduced in Release 8 of LTE standards and are the most basic downlink reference signal in LTE. The CRSs are transmitted in every resource block in the frequency domain and in every downlink subframe. CRS in a cell can be for one, two, or four corresponding antenna ports. CRS may be used by remote terminals to estimate channels for coherent demodulation. A New Carrier Type (NCT) allows temporarily switching off of cells by removing transmission of CRS in four out of five sub frames. This feature reduces power consumed by the power amplifier, as well as the overhead and interference from CRS, as the CRS is no longer continuously transmitted in every subframe across the bandwidth. In addition, the New Carrier Type allows the downlink control channels to be operated using UE-specific Demodulation Reference Symbols. The New Carrier Type might be operated as a kind of extension carrier along with another LTE/LTE-A carrier or alternatively as standalone non-backward compatible carrier.

Figure 5A:
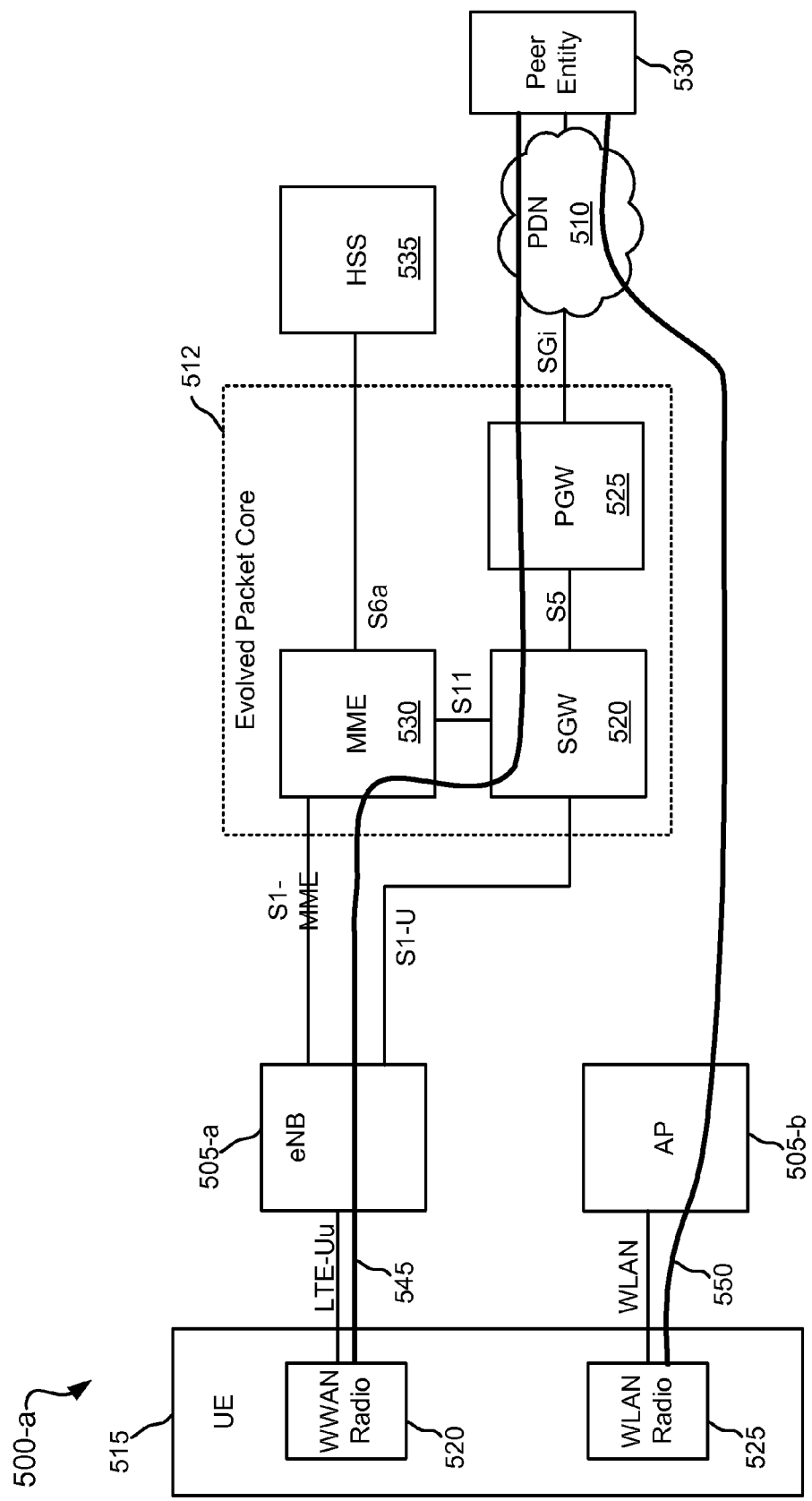
FIGS. 5A and 5B are block diagrams conceptually illustrating examples of data paths between a packet data network (PDN) and a user equipment having aspects configured to manage radio link failure recovery for a user equipment as described herein.
Figure 5B:
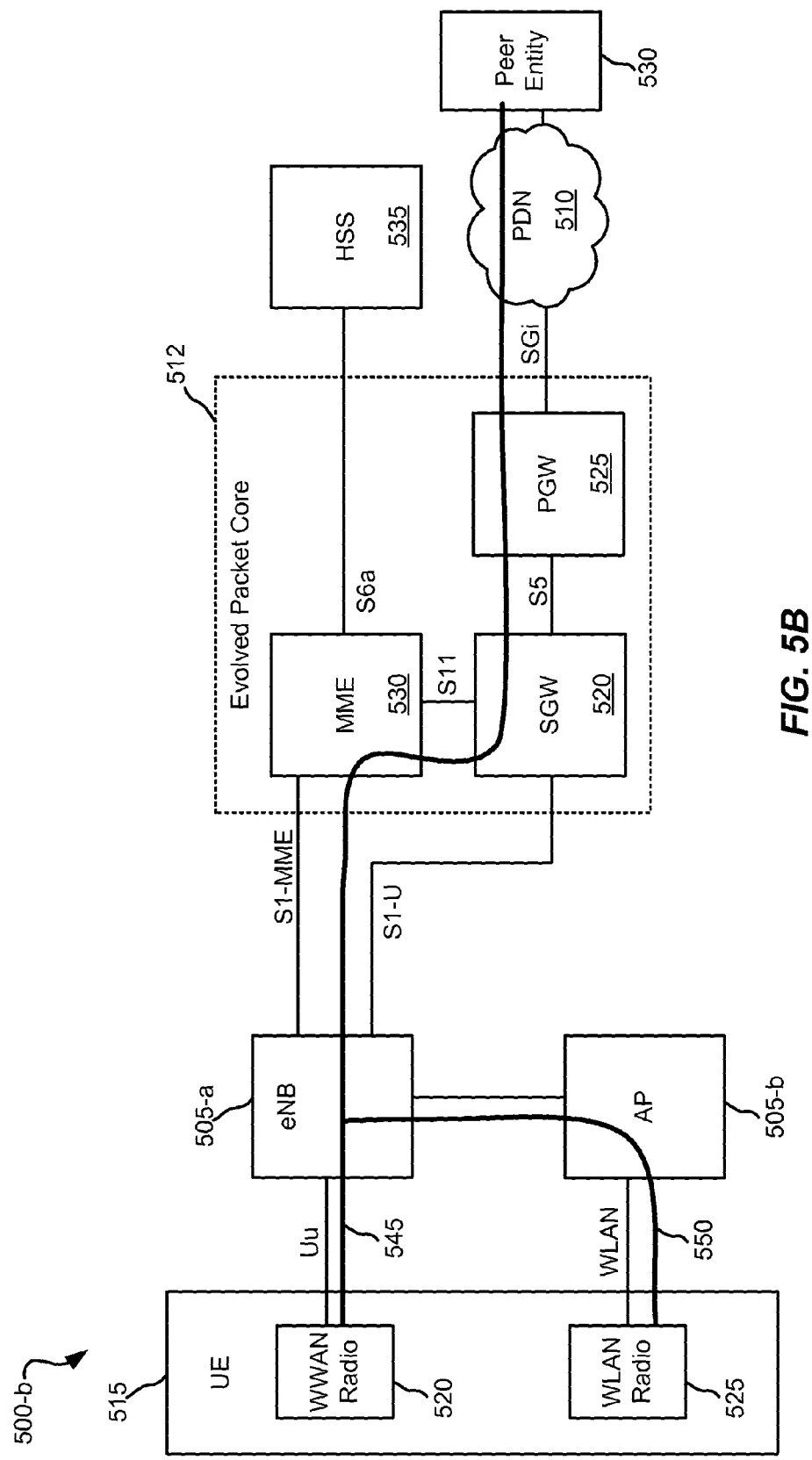

FIGS. 5A and 5B are block diagrams conceptually illustrating examples of data paths 545 and 550 between a UE 515 and a PDN (e.g., the Internet), in wireless communication systems 500-a and 500-b having aspects configured to manage WWAN (e.g., LTE) RLF recovery in accordance with the present aspects. The data paths 545 and 550 are shown within the context of the wireless communication systems 500-a of FIGS. 5A and 500-b of FIG. 5B, which aggregate WLAN and cellular (e.g., LTE) radio access technologies (RATs). In each example, the wireless communication systems 500-a and 500-b may include a multi-mode UE 515, an eNodeB 505-a, and a WLAN AP 505-b. The UE 515 may be an example of one or more of the UEs 120 of FIG. 1, UE 215 of FIG. 2, UE 320 of FIG. 3, and UE 415 of FIG. 4. The eNodeB 505-a may be an example of one or more of the eNodeBs 110 of FIG. 1, eNodeB 205 of FIG. 2, eNodeB 310 of FIG. 3, and eNodeB 405-a of FIG. 4 and the WLAN AP 505-b may be an example of WLAN AP 405-b of FIG. 4.

The wireless communication systems 500-a and 500-b also may include an evolved packet core (EPC) 512, a PDN 510, and a peer entity 530, each of which may be similar to EPC 212, PDN 210, and peer entity 230, respectively, of FIG. 2. The EPC 512 of each example may include a mobility management entity (MME) 505, a serving gateway (SGW) 520, and a PDN gateway (PGW) 525, where SGW 520 and PGW 525 may be similar to SGW 220 and PGW 225 of FIG. 2. A home subscriber system (HSS) 535 may be communicatively coupled with the MME 530. The UE 515 of each example may include an LTE radio 520 and a WLAN radio 525. Referring specifically to FIG. 5A, the eNodeB 505-a and WLAN AP 505-b may be capable of providing the UE 515 with access to the PDN 510 using the aggregation of one or more LTE component carriers or one or more WLAN component carriers. Using this access to the PDN 510, the UE 515 may communicate with the peer entity 530. The eNodeB 505-a may provide access to the PDN 510 through the evolved packet core 512 (e.g., through data path 545), and the WLAN AP 505-b may provide direct access to the PDN 510 (e.g., through data path 550). In an aspect, LTE and WLAN data flows may travel over data paths 545 and 550.

The MME 530 may be the control node that processes the signaling between the UE 515 and the EPC 512. Generally, the MME 530 may provide bearer and connection management. The MME 530 may, therefore, be responsible for idle mode UE tracking and paging, bearer activation and deactivation, and SGW selection for the UE 515. The MME 530 may communicate with the eNodeB 505-a over an S1-MME interface. The MME 530 may additionally authenticate the UE 515 and implement Non-Access Stratum (NAS) signaling with the UE 515.

The HSS 535 may, among other functions, store subscriber data, manage roaming restrictions, manage accessible access point names (APNs) for a subscriber, and associate subscribers with MMEs 530. The HSS 535 may communicate with the MME 530 over an S6a interface defined by the Evolved Packet System (EPS) architecture standardized by the 3 GPP organization.

All user IP packets transmitted over LTE may be transferred through eNodeB 505-a to the SGW 220, which may be connected to the PDN gateway 525 over an S5 signaling interface and the MME 530 over an S11 signaling interface. The SGW 220 may reside in the user plane and act as a mobility anchor for inter-eNodeB handovers and handovers between different access technologies. The PDN gateway 525 may provide UE IP address allocation as well as other functions.

The PDN gateway 525 may provide connectivity to one or more external packet data networks, such as PDN 510, over an SGi signaling interface. The PDN 510 may include the Internet, an Intranet, an IP Multimedia Subsystem (IMS), a Packet-Switched (PS) Streaming Service (PSS), and/or other types of PDNs.

In the present example, user plane data between the UE 515 and the EPC 512 may traverse the same set of one or more EPS bearers (or data flows), irrespective of whether the traffic flows over path 545 of the LTE link or data path 550 of the WLAN link. Signaling or control plane data related to the set of one or more EPS bearers may be transmitted between the LTE radio 520 of the UE 515 and the MME 530 of the EPC 512-b, by way of the eNodeB 505-a.

FIG. 5B illustrates an example wireless communication system 500-b in which the eNodeB 505-a and WLAN AP 505-b are co-located or otherwise in high-speed communication with each other. In this example, EPS bearer-related data between the UE 515 and the WLAN AP 505-b may be routed to the eNodeB 505-a, and then to the EPC 512. In this way, all EPS bearer-related data may be forwarded along the same path between the eNodeB 505-a, the EPC 512, the PDN 510, and the peer entity 530.

Figure 6:
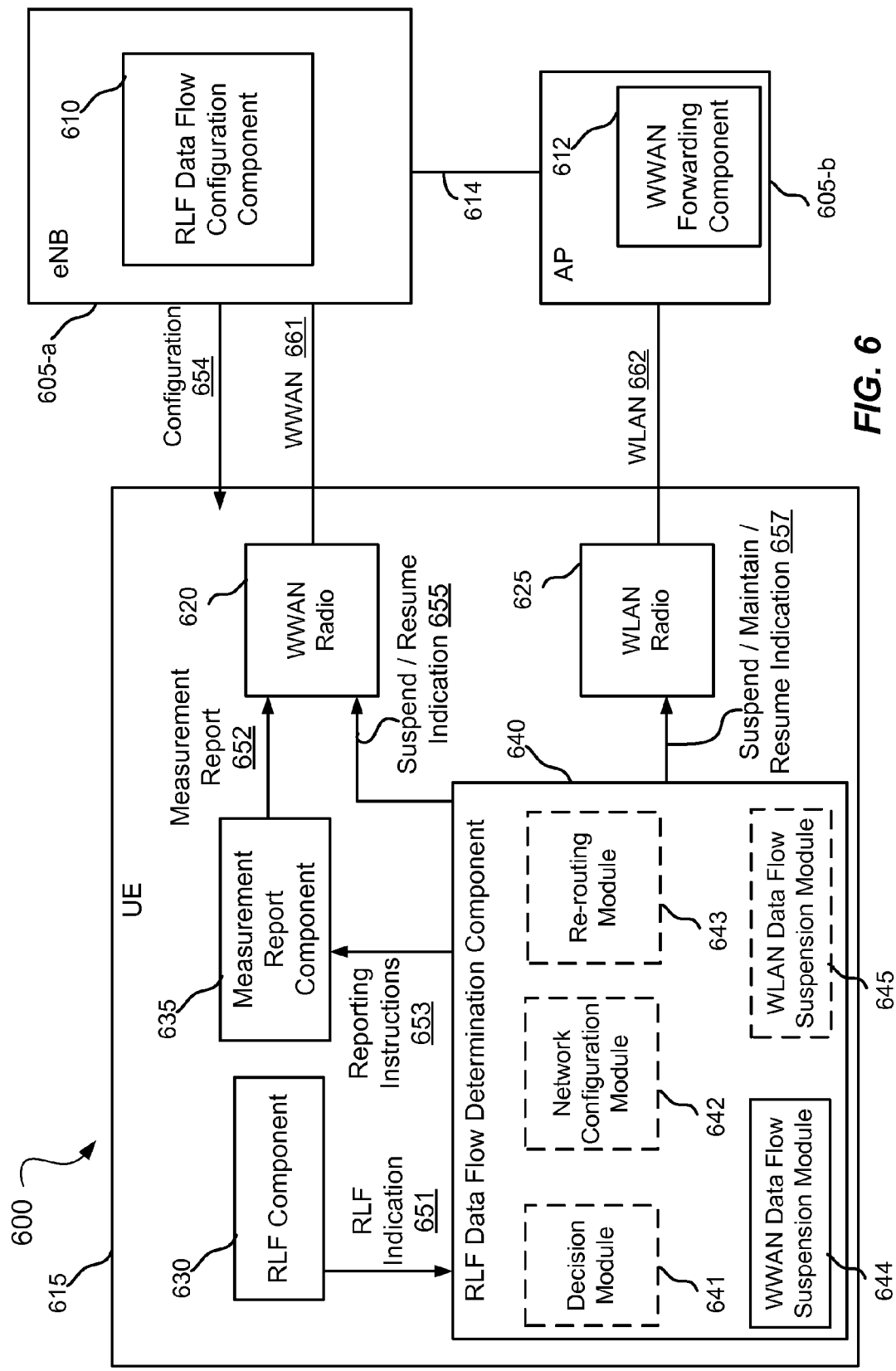
FIG. 6 is a block diagram conceptually illustrating particular aspects of network entities configured to manage radio link failure recovery for a user equipment as described herein.

Referring to FIG. 6, a multimode UE 615 is in communication with an eNodeB 605-a and a WLAN (e.g., Wi-Fi) AP 605-b within a wireless communication system 600 having aspects configured to manage RLF recovery for a user equipment as described herein. The UE 615 may be an example of one or more of the UEs 120 of FIG. 1, UE 215 of FIG. 2, UE 320 of FIG. 3, UE 415 of FIG. 4, and UE 515 of FIGS. 5A and 5B. The eNodeB 605-a may be an example of one or more of the eNodeBs 110 of FIG. 1, eNodeB 205 of FIG. 2, eNodeB 310 of FIG. 3, eNodeB 405-a of FIG. 4, and eNodeB 505-a of FIGS. 5A and 5B. The WLAN AP 605-b may be an example of one or more of WLAN AP 405-b of FIG. 4 and WLAN AP 505-b of FIGS. 5A and 5B. As described above with respect to FIGS. 5A and 5B, wireless communication system 600 may include WWAN (e.g., LTE or UMTS) and WLAN (e.g., Wi-Fi) RATs such that UE 615 may be in communication with both eNodeB 605-a and WLAN AP 605-b, and enables WWAN and WLAN data flows, through various communication paths. This scenario may also be referred to as "dual connectivity" for UE 615, due to the simultaneous or concurrent connections with both eNodeB 605-a and WLAN AP 605-b.

UE 615, eNodeB 605-a, and WLAN AP 605-b may be configured to manage WWAN (e.g., LTE) RLF recovery at UE 615 according to different techniques (e.g., the six different aspects, as shown above in Table 1). More particularly, six aspects are described for handling WLAN data flows throughout the LTE RLF detection and recovery processes. Although these aspects are described separately, it will be understood that some or all of the aspects may be configured to work with one another in any number of combinations, serially and/or in parallel. Accordingly, combinations of these aspects may result in different alternatives for WLAN data flow handling upon LTE RLF.

UE 615 includes an WWAN radio 620 and a WLAN radio 625, which may be the same as or similar to the LTE radio 520 and WLAN radio 525 of UE 515 as shown in FIGS. 5A and 5B. WWAN radio 620 may be configured to provide for communications between UE 615 and eNodeB 605-a over an WWAN radio link 661 (e.g., over path 545 of FIGS. 5A and 5B), while WLAN radio 625 may be configured to provide for communications between UE 615 and WLAN AP 605-b over a WLAN radio link 662 (e.g., over data path 550 of FIGS. 5A and 5B). Each of WWAN radio link 661 and WLAN radio link 662 include at least one data flow (e.g., signaling data flows, user data flows, and/or the like). The UE 615 includes RLF component 630 configured to detect LTE RLF at UE 615 and handle all aspects related to RLF processing, including, for example, RLF detection, cell reselection, and RRC connection reestablishment, as described in the 3GPP family of standards. Upon detecting RLF of WWAN radio link 661, for example due to poor RF conditions, RLF component 630 may be configured to communicate RLF indication 651 to RLF data flow determination component 640.

The RLF data flow determination component 640 is configured to receive RLF indication 651 and determine, based thereon, how to handle LTE and WLAN data flows during the (upcoming) RLF recovery procedure. Optionally, and in various aspects, RLF data flow determination component 640 may include decision module 641, network configuration module 642, and/or re-routing module 643, each of which will be discussed in detail in accordance with the aspects in which each entity is included in RLF data flow determination component 640. In all of the aspects described herein, RLF data flow determination component 640 includes WWAN data flow suspension module 644 configured to suspend LTE data flows upon detection of RLF and/or in response to RLF indication 651. The WWAN data flow suspension module 644 may be configured to generate, and transmit to WWAN radio 620, a suspend/resume indication 655 to indicate whether and when LTE data flows are to be suspended and/or resumed. In some of the aspects described herein, RLF data flow determination component 640 includes WLAN data flow suspension module 645 configured to suspend WLAN data flows upon detection of RLF. The WLAN data flow suspension module 645 may be configured to generate, and transmit to WLAN radio 625, suspend/maintain/resume indication 657 to indicate whether and when WLAN data flows are to be suspended, maintained, and/or resumed.

Additionally, UE 615 includes measurement report component 635 configured to receive reporting instructions 653 from RLF data flow determination component 640 and, in response, generate and transmit measurement report(s) 652 to eNodeB 605-a and/or WLAN AP 605-b. Reporting instructions 653 may include, for example, an indication as to what parameters and/or radio signal conditions to measure, when and how often to perform measurements, which measurements to report, when and how often to report measurements, where to transmit measurement report(s), and/or the like, depending on the particular aspect. Reporting instructions 653 also may include an indication from RLF data flow determination component 640 to delete or maintain all current WLAN measurement entries from any measurement reports upon RLF detection. Measurement report(s) 652 may include information related to radio signal conditions on the LTE and/or WLAN networks as measured by WWAN radio 620 and/or WLAN radio 625, respectively, of the UE 615. Measurement report component 635 may operate in conjunction with WWAN radio 620 and/or WLAN radio 625 to carry out reporting instructions 653. Then, measurement report component 635 may communicate measurement report(s) 652 to WWAN radio 620 for transmission to eNodeB 605-a. In an aspect (not shown) measurement report component 635 may communicate measurement report(s) 652 to WLAN radio 625 for transmission to WLAN AP 605-b.

Optionally, and in some of the aspects described herein, eNodeB 605-a includes RLF data flow configuration component 610 configured to generate, and transmit to UE 615, configuration 654. Configuration 654 may be any information, instructions, and/or the like that may be used to instruct UE 615 as to how to handle LTE and/or WLAN data flows during RLF recovery. For example, configuration 654 may be a quality of service (QoS) parameter that may allow RLF data flow determination component 640 to determine a configuration based thereon and/or the QoS parameter may include an explicit instruction as to how to handle the LTE and WLAN data flows during RLF processing. In another example, configuration 654 may be an access network discovery and selection function (ANDSF) policy, which may be, or include, a flag that indicates whether to suspend WLAN data flow during RLF. RLF data flow determination component 640 on UE 615 may be configured to receive, and utilize, configuration 654 to determine which of decision module 641, network configuration module 642, and/or re-routing module 643, to employ (e.g., which of the six aspects described herein apply to the present scenario) in determining how to handle LTE and WLAN data flows during RLF processing.

Optionally, and in some of the aspects described herein, WLAN AP 605-b includes WWAN forwarding component 612 configured to allow LTE data flows to be maintained (e.g., not suspended) during RLF recovery at UE 615. More particularly, WWAN forwarding component 612 may be configured to communicate with both UE 615 and eNodeB 605-a (via communication connection 614) during RLF processing and determine whether to receive LTE data flows from UE 615 and forward them to eNodeB 605-a and vice versa.

The various aspects of managing RLF recovery, and the corresponding components of UE 615, eNodeB 605-a, and WLAN AP 605-b, will be described further in connection with FIGS. 7-12, which are call flow diagrams that illustrate each aspect in turn.

Figure 7:
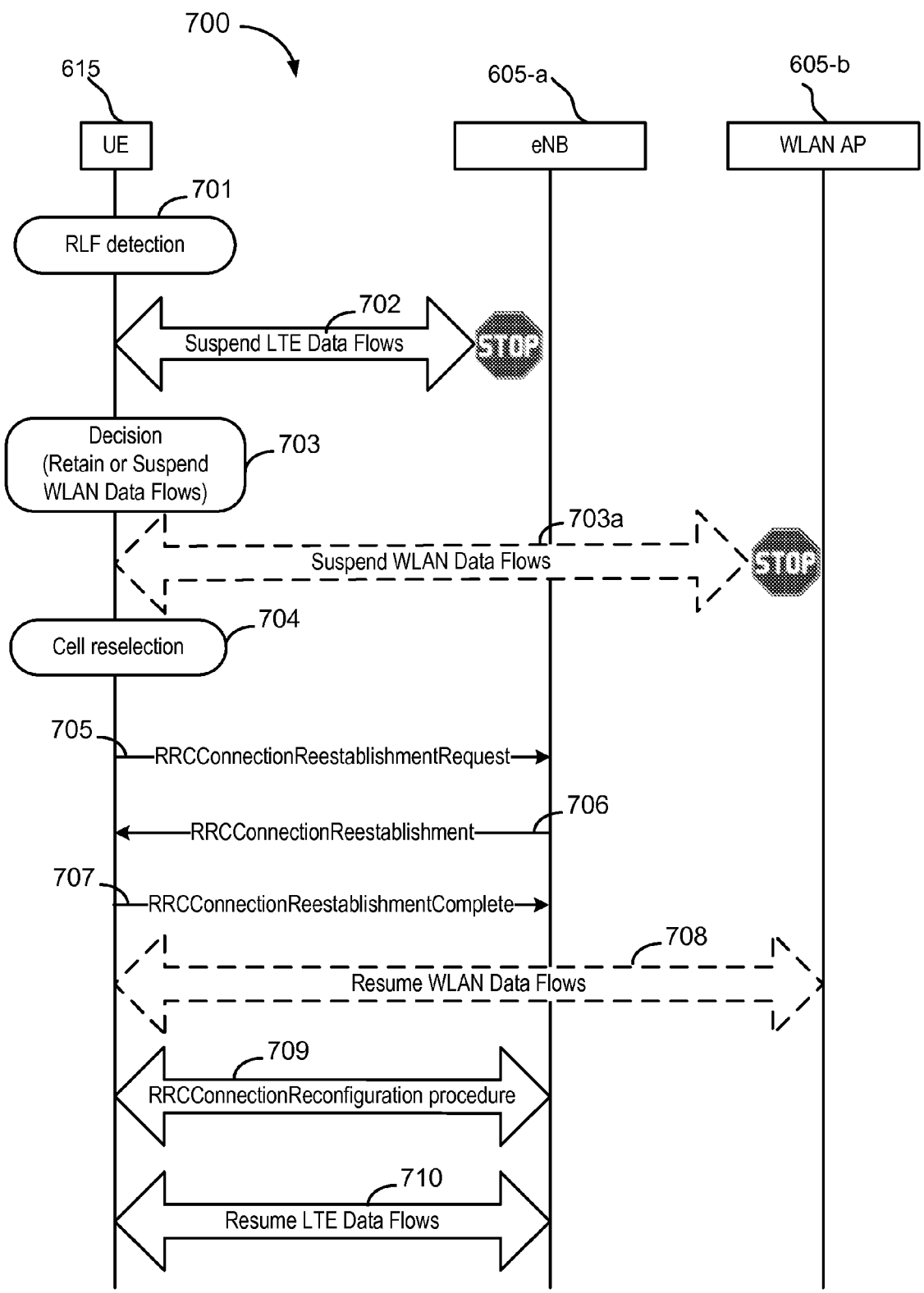
FIG. 7 is a call flow diagram illustrating communications between a user equipment, eNodeB, and WLAN access point according to a first aspect for managing radio link failure recovery for a user equipment as described herein.

Referring to FIG. 7, a call flow 700 illustrates communications between UE 615, eNodeB 605-a, and WLAN AP 605-b of FIG. 6 according to a first aspect for managing RLF recovery for a UE. In particular, in this first aspect, the present apparatus and methods stop LTE data flows, and, optionally, WLAN data flows upon detecting RLF, and retain data flow mapping before RLF for use in reestablishing the data flows upon recovery from the RLF. The actions of call flow 700 are performed by UE 615, including RLF component 630, measurement report component 635, WWAN radio 620, WLAN radio 625, and RLF data flow determination component 640. According to the first aspect, RLF data flow determination component 640 includes WWAN data flow suspension module 644, WLAN data flow suspension module 645, and decision module 641.

At 701, RLF component 630 of UE 615 detects RLF as per the current 3GPP standards. At 702, WWAN data flow suspension module 644 suspends all LTE data flows from being transmitted via WWAN radio 620 over WWAN radio link 661 to eNodeB 605-*a*. Although not shown, WWAN data flow suspension module 644 also indicates to measurement report component 652, via reporting instructions 653, to delete all WLAN measurement entries in any existing measurement reports. At 703, decision module 641 determines whether to suspend WLAN data flows from being transmitted via WLAN radio 625 over WLAN radio link 662 to WLAN AP 605-*b*. If decision module 641 determines to suspend WLAN data flows, which is shown in the example of call flow 700 at 703*a*, WLAN data flows are suspended. If decision module 641 determines not to suspend WLAN data flows (not shown), the WLAN data flows are maintained (or resumed, if temporarily suspended after RLF detection) during RLF processing.

At 704, RLF component 630 performs cell re-selection procedures, according to the current 3GPP standards, and reestablishes the connection between UE 615 and eNodeB 605-*a* or another eNodeB by sending, at 705, an RRC Connection Reestablishment Request message, receiving, at 706, an RRC Connection Reestablishment message, and sending, at 707, an RRC Connection Reestablishment Complete message. In the case where decision module 641 determined to suspend WLAN data flows, at 708, the WLAN data flows are resumed between UE 615 and WLAN AP 605-*b*. At 709, UE 615 and eNodeB 605-*a* perform the RRC Connection Reconfiguration procedure according to the current 3GPP standards. Decision module 641 may be configured to determine that RLF component 630 is performing the RRC Connection Reconfiguration procedure and, in response, provide reporting instructions 653 to measurement report component 635 to instruct measurement report component 635 to measure various network conditions. Measurement report component 635 may do so and transmit a WLAN measurement report 652 to eNodeB 605-*a*. At 710, WWAN data flow suspension module 644 indicates to WWAN radio 620 that LTE data flows are to be resumed based at least in part on the WLAN measurement report 652.

Figure 8:
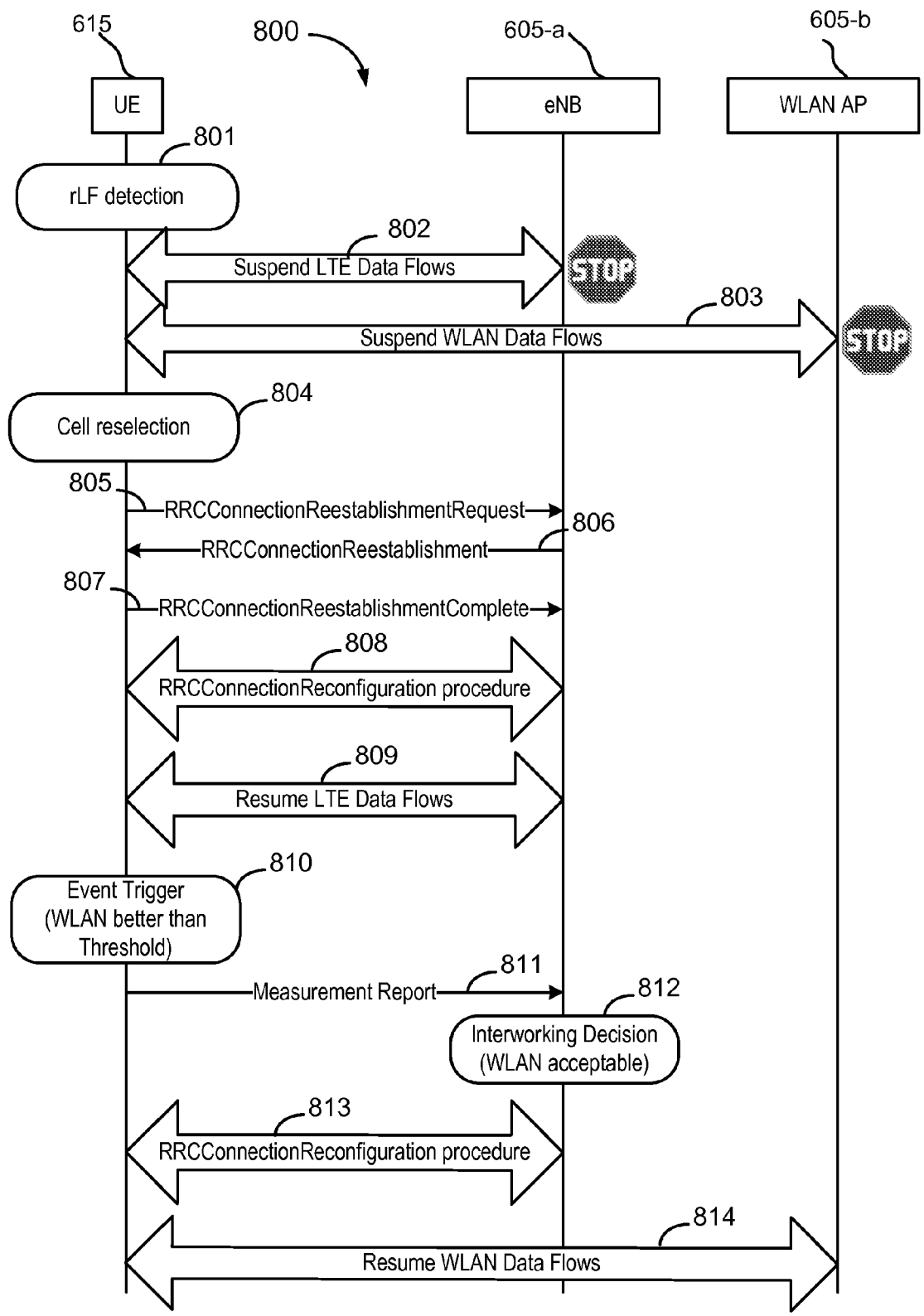
FIG. 8 is a call flow diagram illustrating communications between a user equipment, eNodeB, and WLAN access point according to a second aspect for managing radio link failure recovery for a user equipment as described herein.

Referring to FIG. 8, a call flow 800 illustrates communications between UE 615, eNodeB 605-*a*, and WLAN AP 605-*b* of FIG. 6 according to a second aspect for managing RLF recovery for a UE. In particular, in this second aspect, the present apparatus and methods stop LTE data flows and WLAN data flows upon detecting RLF. The actions of call flow 800 are performed by UE 615, including RLF component 630, measurement report component 635, WWAN radio 620, WLAN radio 625, and RLF data flow determination component 640. According to the second aspect, RLF data flow determination component 640 includes WWAN data flow suspension module 644, WLAN data flow suspension module 645, and network configuration module 642.

At 801, RLF component 630 of UE 615 detects RLF as per the current 3GPP standards. At 802, WWAN data flow suspension module 644 suspends all LTE data flows from being transmitted via WWAN radio 620 over WWAN radio link 661 to eNodeB 605-*a*. Although not shown, RLF data flow determination component 640 provides reporting instructions 653 to measurement report component 635 so that it may delete all WLAN measurement reporting entities in any existing measurement reports. At 803, WLAN data flow suspension module 645 suspends WLAN data flows from being transmitted via WLAN radio 625 over WLAN radio link 662 to WLAN AP 605-*b*. At 804, RLF component 630 performs cell re-selection procedures, according to the current 3GPP standards, and reestablishes the connection between UE 615 and eNodeB 605-*a* by sending, at 805, an RRC Connection Reestablishment Request message, receiving, at 806, an RRC Connection Reestablishment message, and sending, at 807, an RRC Connection Reestablishment Complete message. At 808, UE 615 and eNodeB 605-*a* perform the RRC Connection Reconfiguration procedure for LTE according to the current 3GPP standards.

Network configuration module 642 may be configured to detect that RLF Component 630 is performing the RRC Connection Reconfiguration procedure and inform WWAN data flow suspension module 644 to resume LTE data flows, at 809. Network configuration module 642 also may be configured to provide reporting instructions 653 to measurement report component 635 to instruct measurement report component 635 to measure various network conditions. At 810, once measurement report component 635 determines that the quality of WLAN radio link 662 is greater than a threshold (e.g., a configurable and/or static threshold determined at UE 615 or provided to UE 615 by the network), which may be referred to as a triggering event, at 811, measurement report component 635 transmits a WLAN measurement report 652 to eNodeB 605-*a*. At 812, RLF data flow configuration component 610 of eNodeB 605-*a* determines whether the WLAN radio link 662 is acceptable to resume WLAN data flows based, at least in part, on the WLAN measurement report 652. This may be referred to as an interworking decision since eNodeB 605-*a* determines whether UE 615 may perform interworking, e.g., dual connectivity between WLAN and LTE. At 813, UE 615 and eNodeB 605-*a* perform the RRC Connection Reconfiguration procedure for WLAN according to the current 3GPP standards. Network configuration module 642 receives an indication of the interworking decision of eNodeB 605-*a* and, as such, instructs WLAN data flow suspension module 645 to, at 814, resume WLAN data flows. In response, WLAN data flow suspension module 645 may provide a resume indication 655 to WLAN radio 625 to resume WLAN data flows over WLAN radio link 662.

Figure 9:
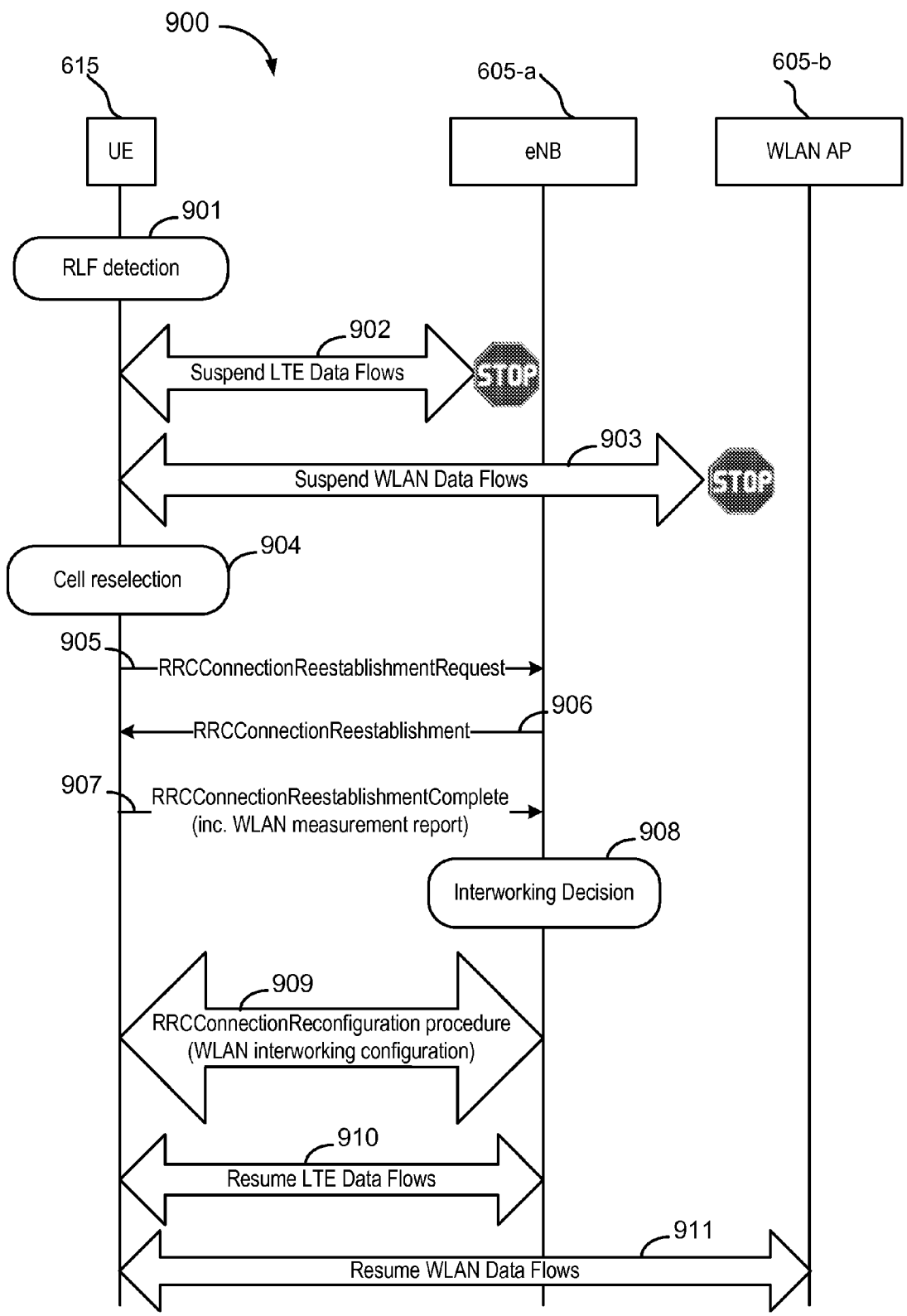
FIG. 9 is a call flow diagram illustrating communications between a user equipment, eNodeB, and WLAN access point according to a third aspect for managing radio link failure recovery for a user equipment as described herein.

Referring to FIG. 9, a call flow 900 illustrates communications between UE 615, eNodeB 605-*a*, and WLAN AP 605-*b* of FIG. 6 according to a third aspect for managing RLF recovery for a UE. In particular, in this third aspect, the present apparatus and methods stop LTE data flows and WLAN data flows upon detecting RLF. The actions of call flow 900 are performed by UE 615, including RLF component 630, measurement report component 635, WWAN radio 620, WLAN radio 625, and RLF data flow determination component 640. According to the third aspect, RLF data flow determination component 640 includes WWAN data flow suspension module 644, WLAN data flow suspension module 645, and network configuration module 642. The third aspect as described with respect to call flow 900 is similar to the second aspect of FIG. 8 except for the timing as to when the WLAN measurement report 652 is generated and transmitted to eNodeB 605-*a*.

At 901, RLF component 630 of UE 615 detects RLF as per the current 3GPP standards. At 902, WWAN data flow suspension module 644 suspends all LTE data flows from being transmitted via WWAN radio 620 over WWAN radio link 661 to eNodeB 605-*a*. In this aspect (not shown), RLF data flow determination component 640 instructs measurement report component 635, via reporting instructions 653, to maintain WLAN measurement reporting entities in any existing measurement reports. At 903, WLAN data flow suspension module 645 suspends WLAN data flows from being transmitted via WLAN radio 625 over WLAN radio link 662 to WLAN AP 605-*b*. At 904, RLF component 630 performs cell reselection procedures, according to the current 3GPP standards, and reestablishes the connection between UE 615 and eNodeB 605-*a* by sending, at 905, an RRC Connection Reestablishment Request message, receiving, at 906, an RRC Connection Reestablishment message, and sending, at 807, an RRC Connection Reestablishment Complete message.

In this aspect, network configuration module 642 may be configured to provide reporting instructions 653 to measurement report component 635 to instruct measurement report component 635 to measure various network conditions upon determination by network configuration module 642 that the RRC Connection Reestablishment process is underway by RLF component 630. Measurement report component 635 may be configured to generate a WLAN measurement report 652 and transmit it as part of the RRC Connection Reestablishment Complete message, at 907. In another aspect, the existing measurement reports that were maintained may be transmitted as part of the RRC Connection Reestablishment Complete message. At 908, eNodeB 605-*a* has received the WLAN measurement report 652 and, based at least in part thereon, RLF data flow configuration component 610 may be configured to make an interworking decision, e.g., determine whether to resume WLAN data flows at UE 615. If the interworking decision is to resume WLAN data flows, at 909, UE 615 and eNodeB 605-*a* perform the RRC Connection Reconfiguration procedure for WLAN and LTE according to the current 3GPP standards. If the interworking decision is not to resume WLAN data flows (not shown), the RRC Connection Reconfiguration procedure at 909 may be for LTE only. Network configuration module 642 may be configured to detect that RLF Component 630 is performing the RRC Connection Reconfiguration procedure and inform WWAN data flow suspension module 644 to resume LTE data flows by sending a suspend/resume indication 655 to WWAN radio 620 and resuming LTE data flows on WWAN radio link 661, at 910. At 911, and based on the interworking decision at 908, network configuration module 642 may similarly be configured to inform WLAN Data flow suspension module 645 to resume WLAN data flows by sending a resume indication 656 to WLAN radio 625 to resume WLAN Data flows on WLAN radio link 662.

Figure 10:
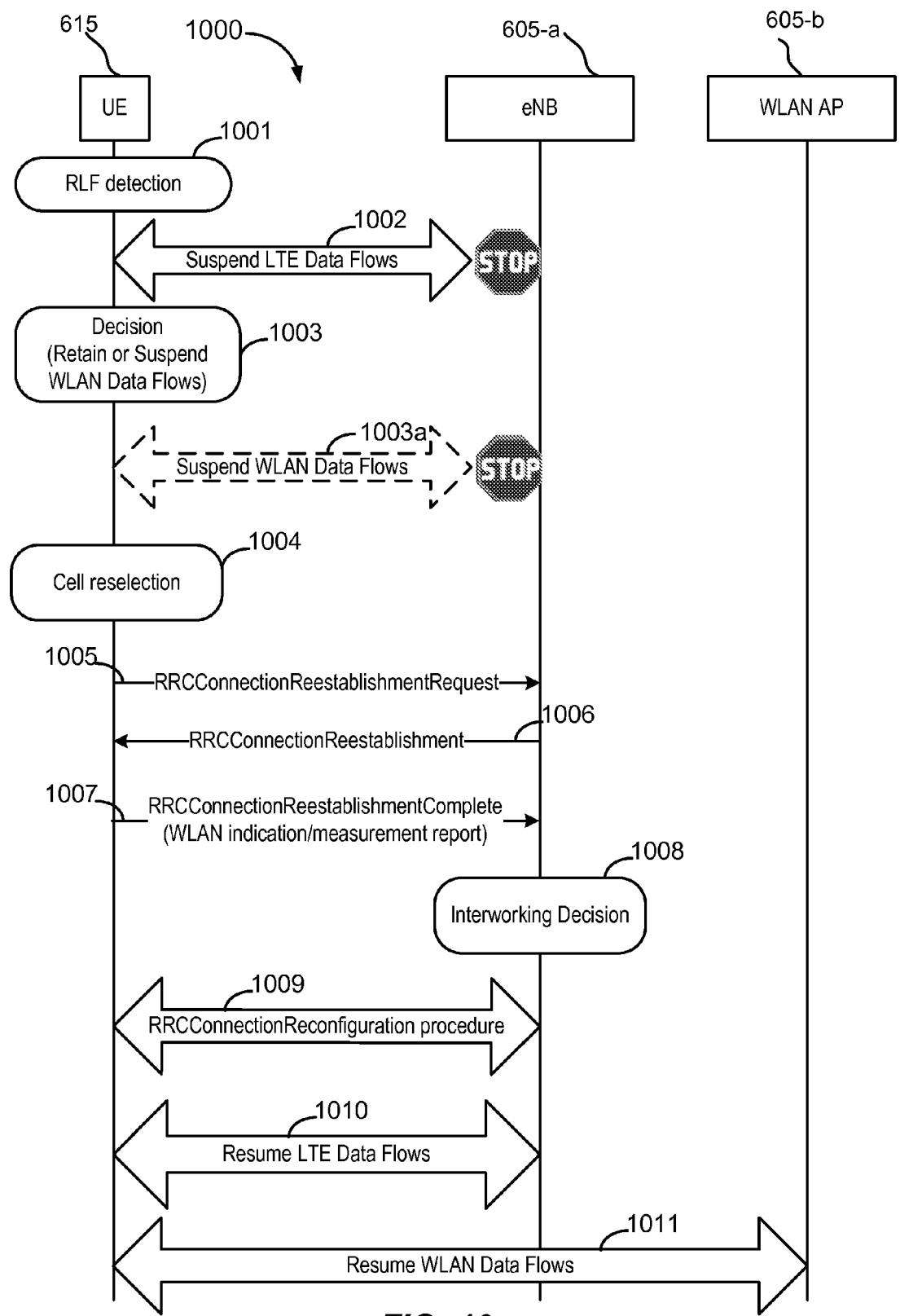
FIG. 10 is a call flow diagram illustrating communications between a user equipment, eNodeB, and WLAN access point according to a fourth aspect for managing radio link failure recovery for a user equipment as described herein.

Referring to FIG. 10, a call flow 1000 illustrates communications between UE 615, eNodeB 605-*a*, and WLAN AP 605-*b* of FIG. 6 according to a fourth aspect for managing RLF for a UE. In particular, in this fourth aspect, the present apparatus and methods stop LTE data flows and, may optionally stop WLAN data flows upon detecting RLF. The actions of call flow 1000 are performed by UE 615, including RLF component 630, measurement report component 635, WWAN radio 620, WLAN radio 625, and RLF data flow determination component 640. According to the fourth aspect, RLF data flow determination component 640 includes WWAN data flow suspension module 644, WLAN data flow suspension module 645, and decision module 641.

At 1001, RLF component 630 of UE 615 detects RLF as per the current 3GPP standards. At 1002, WWAN data flow suspension module 644 suspends all LTE data flows from being transmitted via WWAN radio 620 over WWAN radio link 661 to eNodeB 605-*a*. At 1003 (and similar to the first aspect of call flow 700), decision module 641 determines whether to suspend WLAN data flows from being transmitted via WLAN radio 625 over WLAN radio link 662 to WLAN AP 605-*b*. If decision module 641 determines to suspend WLAN data flows, which is shown in the example of call flow 1000 at 1003*a*, WLAN data flows are suspended. If decision module 641 determines not to suspend WLAN data flows (not shown), the WLAN data flows are maintained and (or resumed, if WLAN data flows were temporarily suspended upon RLF detection) during RLF processing. At 1004, RLF component 630 performs cell re-selection procedures, according to the current 3GPP standards, and reestablishes the connection between UE 615 and eNodeB 605-*a* by sending, at 1005, an RRC Connection Reestablishment Request message, receiving, at 1006, an RRC Connection Reestablishment message, and sending, at 1007, an RRC Connection Reestablishment Complete message.

Decision module 641 may be configured to provide reporting instructions 653 to measurement report component 635 to instruct measurement report component 635 to measure various network conditions upon determination by network configuration module 642 that the RRC Connection Reestablishment process is underway by RLF component 630. Measurement report component 635 may be configured to generate a WLAN measurement report 652 and transmit it as part of the RRC Connection Reestablishment Complete message, at 1007. At 1008, eNodeB 605-*a* has received the WLAN measurement report 652 and based at least in part thereon, RLF data flow configuration component 610 may be configured to make an interworking decision, e.g., determine whether to resume WLAN data flows at UE 615. More particularly, RLF data flow configuration component 610 at eNodeB 605-*a* may be configured to determine whether to maintain or override the determination by the UE 615 as to whether to resume WLAN data flows. If the interworking decision is to resume WLAN data flows, at 1009, UE 615 and eNodeB 605-*a* perform the RRC Connection Reconfiguration procedure for WLAN and LTE according to the current 3GPP standards. If the interworking decision is not to resume WLAN data flows (not shown), the RRC Connection Reconfiguration procedure at 1009 may be for LTE only.

Network configuration module 642 may be configured to detect that RLF Component 630 is performing the RRC Connection Reconfiguration procedure and inform WWAN data flow suspension module 644 to resume LTE data flows by sending a resume indication 655 to WWAN radio 620 and resuming LTE data flows on WWAN radio link 661, at 1010. At 1011, network configuration module 642 may similarly be configured to inform WLAN data flow suspension module 645 to resume WLAN data flows by sending a resume indication 656 to WLAN radio 625 to resume WLAN Data flows on WLAN radio link 662 based on interworking decision 1008.

Figure 11:
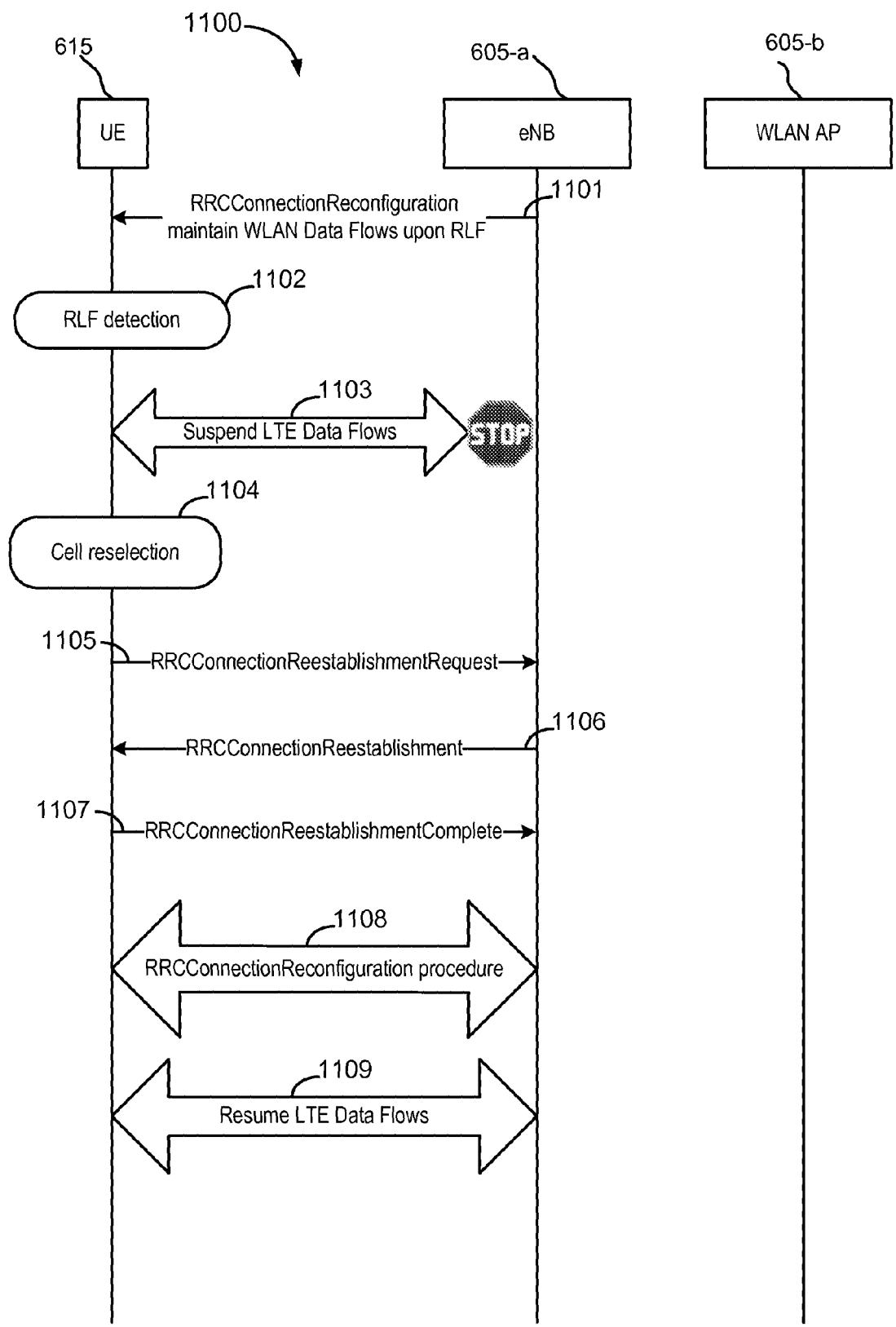
FIG. 11 is a call flow diagram illustrating communications between a user equipment, eNodeB, and WLAN access point according to a fifth aspect for managing radio link failure recovery for a user equipment as described herein.

Referring to FIG. 11, a call flow 1100 illustrates communications between UE 615, eNodeB 605-*a*, and WLAN AP 605-*b* of FIG. 6 according to a fifth aspect for managing RLF for a UE. In particular, in this fifth aspect, the present apparatus and methods stop LTE data flows upon detecting RLF. The actions of call flow 1100 are performed by UE 615, including RLF component 630, measurement report component 635, WWAN radio 620, WLAN radio 625, and RLF data flow determination component 640. According to the fifth aspect, RLF data flow determination component 640 includes WWAN data flow suspension module 644, WLAN data flow suspension module 645, and network configuration module 642.

At 1101, RLF data flow configuration component 610 of eNodeB 605-*a* transmits an RRC Connection Reconfiguration message (e.g., configuration 654) to UE 615 to instruct UE 615 as to whether to suspend or maintain WLAN data flows during RLF processing. In the example of call flow 1100, the RRC Connection Reconfiguration message sent at 1101 instructs UE 615 to maintain WLAN data flows during RLF processing. In another example (not shown), the RRC Connection Reconfiguration message sent at 1101 may instruct UE 615 to suspend WLAN data flows during RLF processing.

At 1102, RLF component 630 of UE 615 detects RLF as per the current 3GPP standards. At 1103, WWAN data flow suspension module 644 suspends all LTE data flows from being transmitted via WWAN radio 620 over WWAN radio link 661 to eNodeB 605-a. At 1104, RLF component 630 performs cell re-selection procedures, according to the current 3GPP standards, and reestablishes the connection between UE 615 and eNodeB 605-a by sending, at 1105, an RRC Connection Reestablishment Request message, receiving, at 1106, an RRC Connection Reestablishment message, and sending, at 1107, an RRC Connection Reestablishment Complete message. At 1108, UE 615 and eNodeB 605-a perform the RRC Connection Reconfiguration procedure for LTE according to the current 3GPP standards. Network configuration module 642 may be configured to detect that RLF Component 630 is performing the RRC Connection Reconfiguration procedure and inform WWAN data flow suspension module 644 to resume LTE data flows, at 1109. In an aspect where eNodeB 605-a configured UE 615 to suspend WLAN data flows during RLF processing (not shown) per RRC Connection Reconfiguration message, at 1101, network configuration module 642 may inform WLAN data flow suspension module 645 to resume WLAN data flows.

Figure 12:
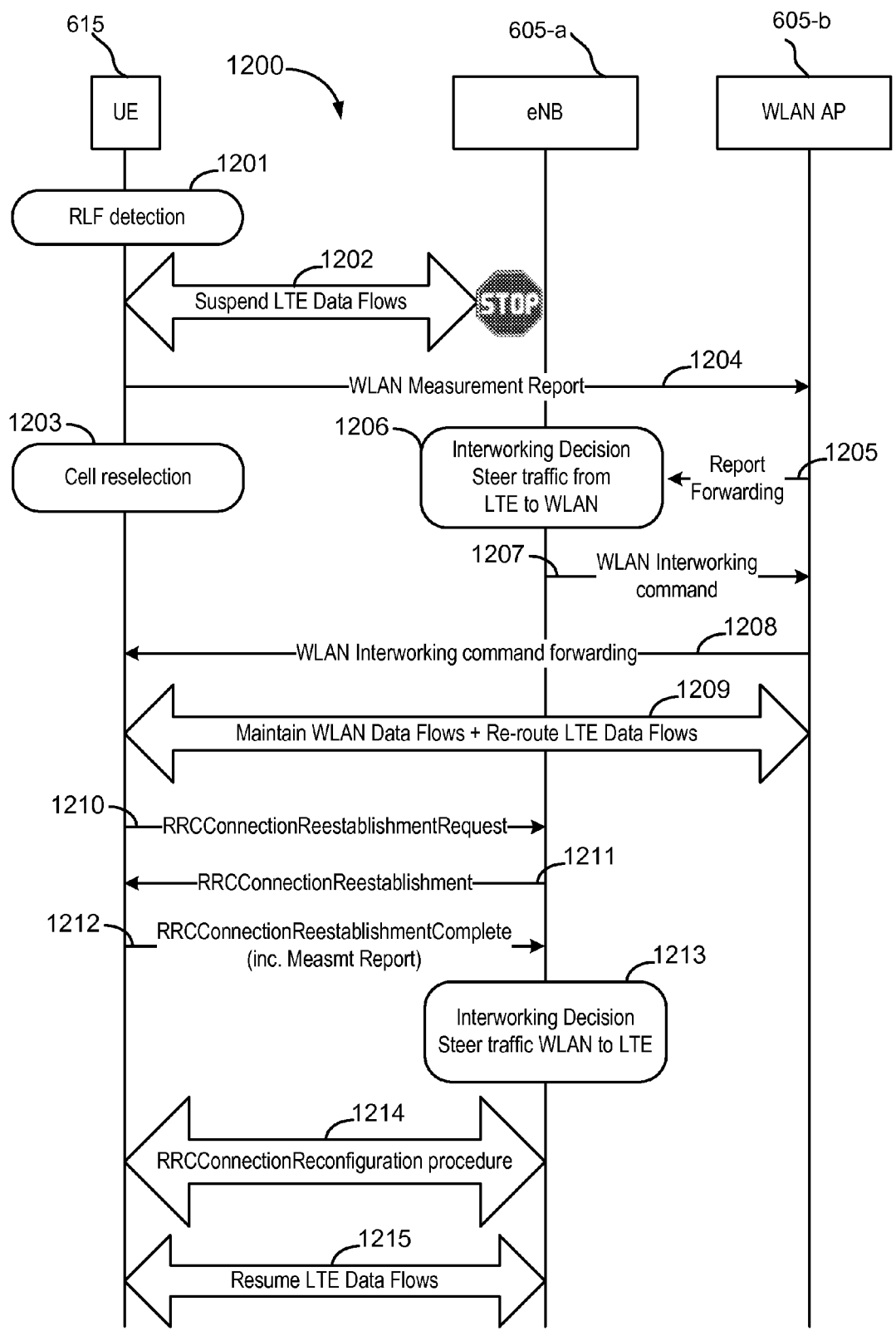
FIG. 12 is a call flow diagram illustrating communications between a user equipment, eNodeB, and WLAN access point according to a sixth aspect for managing radio link failure recovery for a user equipment as described herein.

Referring to FIG. 12, a call flow 1200 illustrates communications between UE 615, eNodeB 605-a, and WLAN AP 605-b of FIG. 6 according to a sixth aspect for managing RLF for a UE. In particular, in this sixth aspect, the present apparatus and methods optionally re-route LTE data flows upon detecting RLF. The actions of call flow 1200 are performed by UE 615, including RLF component 630, measurement report component 635, WWAN radio 620, WLAN radio 625, and RLF data flow determination component 640. According to the sixth aspect, RLF data flow determination component 640 includes WWAN data flow suspension module 644, WLAN data flow suspension module 645, and re-routing module 643.

At 1201, RLF component 630 detects RLF according to the current 3GPP standards and provides RLF indication 651 to RLF data flow determination component 640. At 1202, LTE data flow suspension module may be configured to send a suspend indication 655 to WWAN radio 620. Further, re-routing module 643 re-routes signaling radio bearer (e.g., SRB1) to WLAN AP 605-b via WLAN radio 625 and further re-routes (e.g., offloads) all LTE data flows until an LTE connection can be reestablished between UE 615 and eNodeB 605-a. At 1203, RLF component 630 performs cell reselection processing as a result of detecting RLF, according to the current 3GPP standards. At 1204, RLF data flow determination component 640 instructs measurement report component 635, via reporting instructions 653, to generate a WLAN measurement report 652 and transmit the WLAN measurement report 652 to WLAN AP 605-b via WLAN radio 625.

At 1205, WWAN forwarding component 612 of WLAN AP 605-b forwards the WLAN measurement report 652 to eNodeB 605-a via backhaul. At 1206, RLF Data flow configuration component 610 of eNodeB 605-a makes an interworking decision as to whether LTE data flows should be re-routed via WLAN AP 605-b until RLF recovery processing is complete and LTE communications are reestablished (e.g., until LTE data flows may resume). At 1207, eNodeB 605-a transmits its interworking decision to WLAN AP 605-b. In the example of call flow 1200, eNodeB 605-a determines to continue re-routing LTE data flows via WLAN AP 605-b.

At 1208, WLAN AP 605-b forwards the WLAN interworking command (e.g., interworking decision) to UE 615. At 1209, re-routing module 643 informs WWAN data flow suspension module 644 and WLAN data flow suspension module 645 to resume LTE data flows and continue WLAN data flows via WLAN radio link 662, respectively. Both LTE data flows and WLAN data flows are transmitted over WLAN radio link 662 via WLAN radio 625.

Meanwhile, RLF component 630 reestablishes the connection between UE 615 and eNodeB 605-a by sending, at 1210, an RRC Connection Reestablishment Request message, receiving, at 1211, an RRC Connection Reestablishment message, and sending, at 1212, an RRC Connection Reestablishment Complete message. Re-routing module 643 may be configured to provide reporting instructions 653 to measurement report component 635 to instruct measurement report component 635 to measure various network conditions upon determination by network configuration module 642 that the RRC Connection Reestablishment process is underway by RLF component 630. Measurement report component 635 may be configured to generate an LTE and/or WLAN measurement report 652 and transmit the WLAN measurement report as part of the RRC Connection Reestablishment Complete message, at 1212.

Once the reestablishment procedure is complete, UE 615 and eNodeB 605-a are in communication again via LTE and SRB1 is reestablished. As such, at 1213, eNodeB 605-a determines whether to re-route (e.g., fallback) the LTE data flows, which are currently being transmitted over WLAN radio link 662, back to WWAN radio link 661. As such, RLF data flow configuration component 610 makes an interworking decision based at least in part on the WLAN measurement report 652. If the interworking decision is to resume LTE data flows, at 1214, UE 615 and eNodeB 605-a perform the RRC Connection Reconfiguration procedure for LTE according to the current 3GPP standards. If the interworking decision is not to resume LTE data flows (not shown), the RRC Connection Reconfiguration procedure at 1214 may not occur at this time. Re-routing module 643 may inform WWAN data flow suspension module 644 to resume LTE data flows by sending a resume indication 655 to WWAN radio 620 and resuming LTE data flows on WWAN radio link 661, at 1215.

Figure 13:
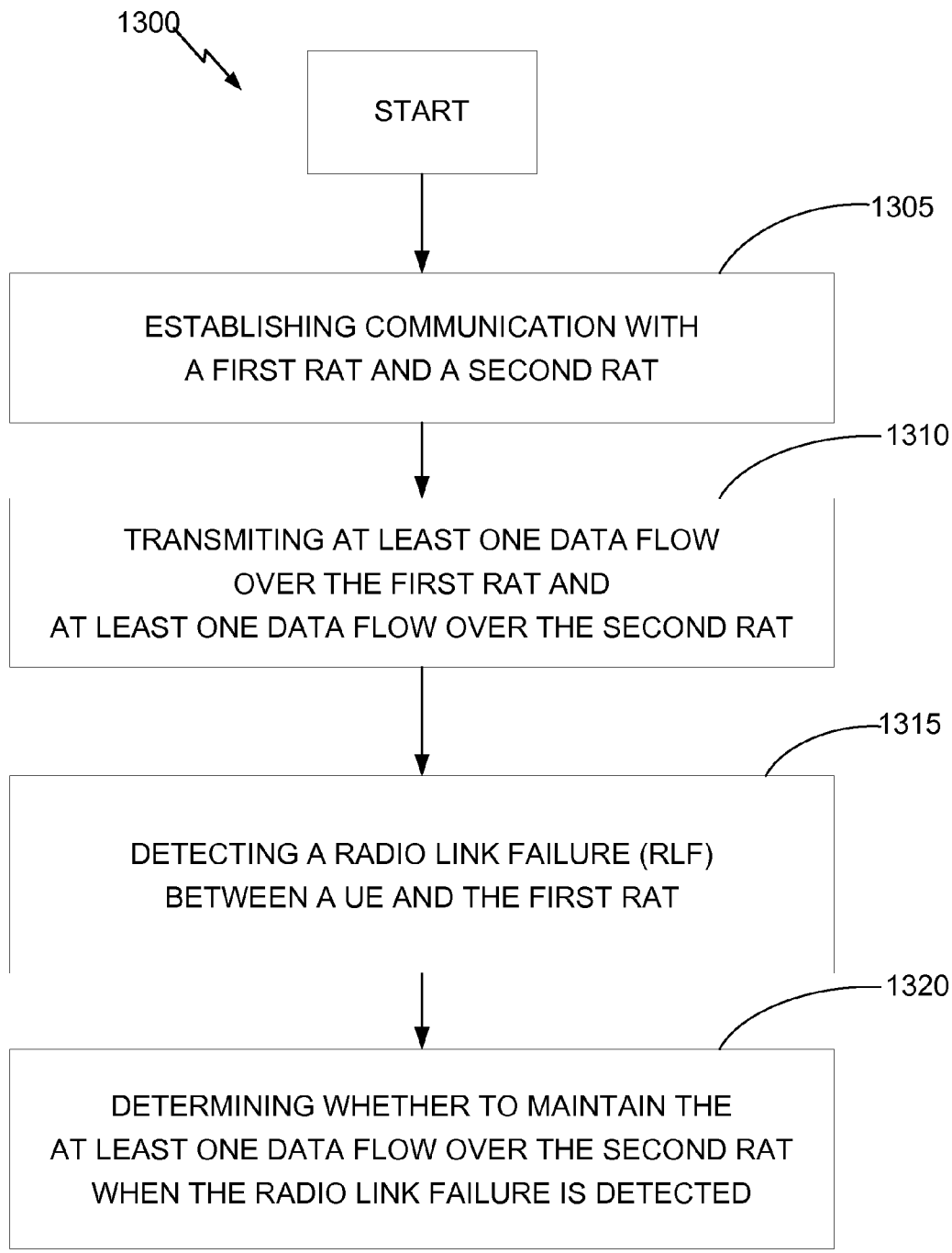
FIG. 13 is a block diagram illustrating a method for managing radio link failure recovery by a user equipment as described herein.

Referring to FIG. 13, a method 1300 for managing radio link failure recovery by a user equipment, such as, for example one of UEs 120 of FIG. 1, UE 215 of FIG. 2, UE 320 of FIG. 3, UE 415 of FIG. 4, UE 515 of FIGS. 5A and 5B, and UE 615 of FIGS. 6-12. For simplicity, the aspects of method 1300 are described as being performed by UE 615 in communication with eNodeB 605-a and/or WLAN AP 605-b as generally illustrated by FIG. 6. More particularly, aspects of the method 1300 may be performed by, for example, RLF component 630, measurement report component 635, RLF data flow determination component 640, WWAN radio 620, and/or WLAN radio 625.

At 1305, the method 1300 includes establishing communication with a first radio access technology (RAT) and a second RAT. For example, UE 615 and/or WWAN radio 620 and WLAN radio 625, respectively, may be configured to establish communications with eNodeB 605-a via the first RAT of a WWAN (e.g., LTE) and WLAN AP 605-b via the second RAT of WLAN (e.g., Wi-Fi).

At 1310, the method 1300 includes transmitting at least one data flow over the first RAT and at least one data flow over the second RAT. For example, UE 615 and/or WWAN radio 620 transmits LTE data flows over WWAN radio link 661 to eNodeB 605-a and UE 615 and/or WLAN radio 625 transmits WLAN data flows over WLAN radio link 662 to WLAN AP 605-*b*. In an aspect, a WWAN (e.g., LTE) data flow may be or may be associated with a bearer, a traffic flow template (TFT), a transmission control protocol (TCP) connection, and/or a quality of service (QoS) class.

At 1315, the method 1300 includes detecting a radio link failure (RLF) between the user equipment and the first RAT. For example, UE 615 and/or RLF component 630 may be configured to detect RLF according to the procedures described in the 3GPP standards.

At 1320, the method 1300 includes determining whether to maintain the at least one data flow over the second RAT when the RLF is detected. For example, RLF data flow determination component 640 may be configured to receive RLF indication 651 from RLF component 630, upon RLF detection and, in response, determine whether to maintain (e.g., suspend or not suspend) the WLAN data flows during RLF recovery processing.

According to the second and third aspects, and optionally in the first, fourth, and fifth aspects, the method 1300 may include determining to suspend the transmission of one or more data flows (e.g., WLAN data flows) over the second RAT and suspending the transmission of the one or more data flows (e.g., WLAN data flows) over the second RAT. In some aspects, the method 1300 may include detecting recovery from RLF, and resuming the transmission of the one or more data flows (e.g., WLAN data flows) over the second RAT. In some aspects, the method 1300 may include detecting recovery from RLF, and resuming the transmission of the one or more suspended data flows (e.g., LTE data flows) over the first RAT. In some aspects, the method 1300 may include detecting recovery from RLF, receiving a configuration 654 from the first RAT (e.g., eNodeB 605-*a*), resuming the transmission of the one or more suspended data flows (e.g., LTE data flows) over the second RAT (e.g., WLAN), and transmitting information related to the second RAT (e.g., WLAN) to the first RAT (e.g., LTE). In this case, the configuration may be received from the first RAT in response to transmitting the information. The information may be a measurement report for LTE and/or WLAN. The information may be indications, one for each WLAN data flow, indicating whether the UE suspended the transmission for a particular data flow (e.g., WLAN data flow) over the second RAT RLF. The information may be indications, one for each LTE data flow and one for each WLAN data flow, of whether the UE will resume the transmission for each of the data flows over the first RAT (e.g., LTE) or the second RAT (e.g., WLAN).

According to the sixth aspect, and optionally in the first, fourth, and fifth aspects, the method 1300 may include determining to maintain the transmission of the at least one data flow (e.g., WLAN data flows) over the second RAT. In some aspects, the determining is based on at least one of a network configuration (e.g., configuration 654) received at the UE, an access network discovery and selection function (ANDSF) policy (e.g., a flag), a quality of service (QoS) parameter, and/or an implementation of the UE.

According to the sixth aspect, the method 1300 may include transmitting control signaling (e.g., LTE RRC signaling, NAS signaling, and/or the like) over the second RAT (e.g., WLAN) during RLF.

Figure 14:
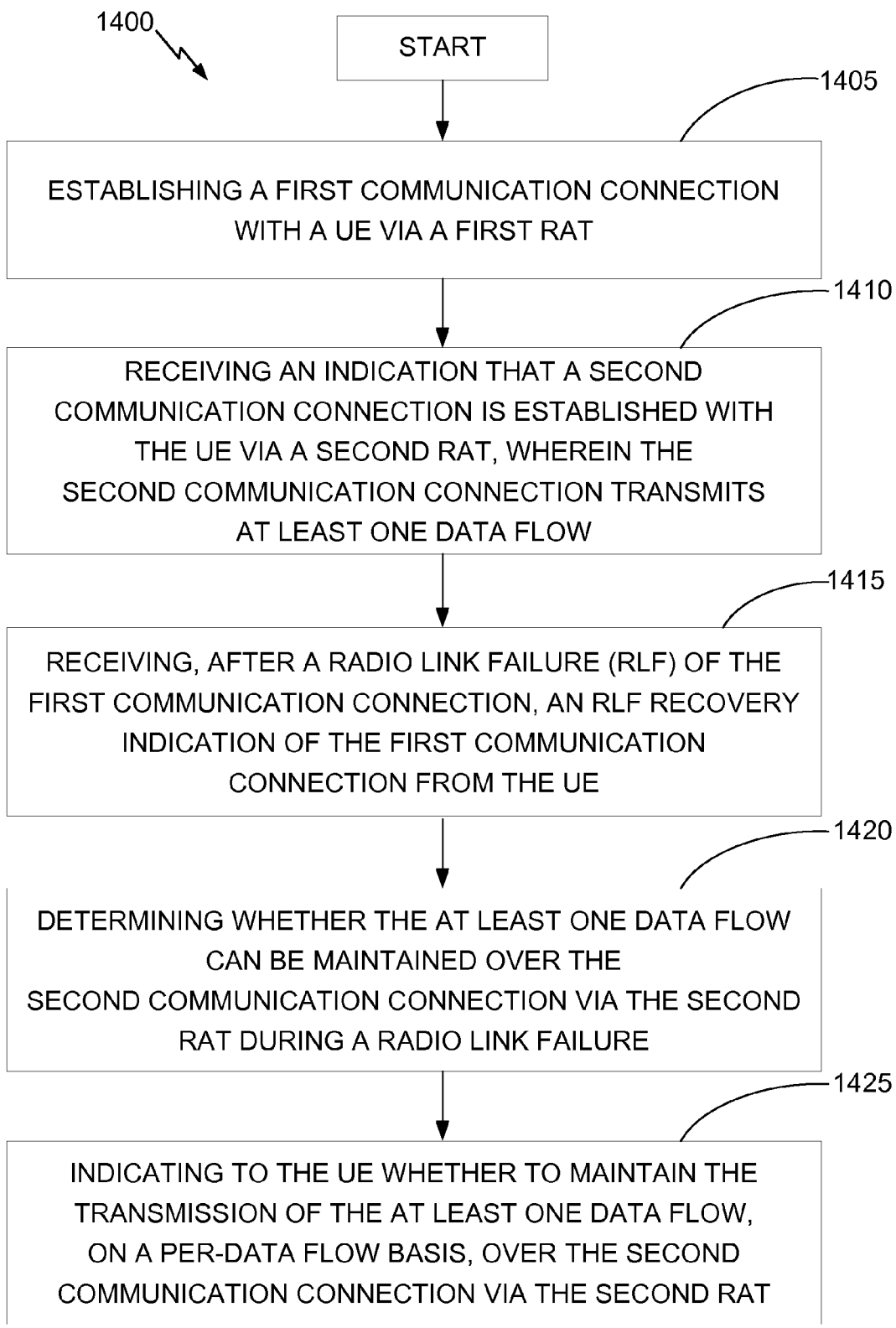
FIG. 14 is a block diagram illustrating a method for managing radio link failure recovery at a user equipment by a first eNodeB as described herein.

Referring to FIG. 14, a method 1400 for managing radio link failure recovery at a user equipment may be performed by a first eNodeB, which may be, for example, one of eNodeBs 110 of FIG. 1, eNodeB 205 of FIG. 2, eNodeB 310 of FIG. 3, eNodeB 405-*a* of FIG. 4, eNodeB 505-*a* of FIGS. 5A and 5B, and eNodeB 605-*a* of FIGS. 6-12. For simplicity, the aspects of method 1400 are described as being performed by eNodeB 605-*a* in communication with UE 615 and/or WLAN AP 605-*b*, as generally illustrated by FIG. 6. In the example of method 1400, eNodeB 605-*a* configures UE 615 to handle WLAN data flows during RLF processing.

At 1405, the method 1400 includes establishing a first communication connection with a user equipment via a first radio access technology (RAT). For example, eNodeB 605-*a* is configured to establish a first communication connection with UE 615 over LTE. In an aspect, the establishing the first communication connection may be a result of the UE 615 moving from an idle state to a connected state or as a result of UE 615 being handed over from another eNodeB to eNodeB 605-*a*.

At 1410, the method 1400 includes receiving an indication that a second communication connection is established with the user equipment via a second RAT, wherein the second communication connection transmits at least one data flow. For example, eNodeB 605-*a* is configured to receive an indication from UE 615 that UE 615 is also in communication with WLAN AP 605-*b* and that UE 615 is transmitting at least one WLAN data flow to WLAN AP 605-*b* over WLAN.

At 1415, the method 1400 includes receiving, after a radio link failure of the first communication connection, a radio link failure (RLF) recovery indication of the first communication connection from the user equipment. For example, eNodeB 605-*a* may be configured to receive an indication from UE 615 that it is recovering from RLF such that UE 615 is in communication with eNodeB 605-*a* via LTE and UE 615 is in communication with WLAN AP 605-*b* via WLAN.

At 1420, the method 1400 includes determining whether the at least one data flow can be maintained over the second communication connection via the second RAT during a radio link failure. For example, RLF data flow configuration component 610 of eNodeB 605-*a* may be configured to determine whether UE 615 should maintain or suspend WLAN data flows during RLF.

At 1425, the method 1400 includes indicating to the user equipment whether to maintain the transmission of the at least one data flow, on a per-data flow basis, over the second communication connection via the second RAT. For example, eNodeB 605-*a* may be configured to indicate (e.g., via configuration 654) to UE 615 whether to suspend or maintain the WLAN data flows on a per-data flow basis. The eNodeB 605-*a* may provide the indication to UE 615 via a configuration message (e.g., a RRC message) or a data message sent by eNodeB 605-*a* to UE 615.

Figure 15:
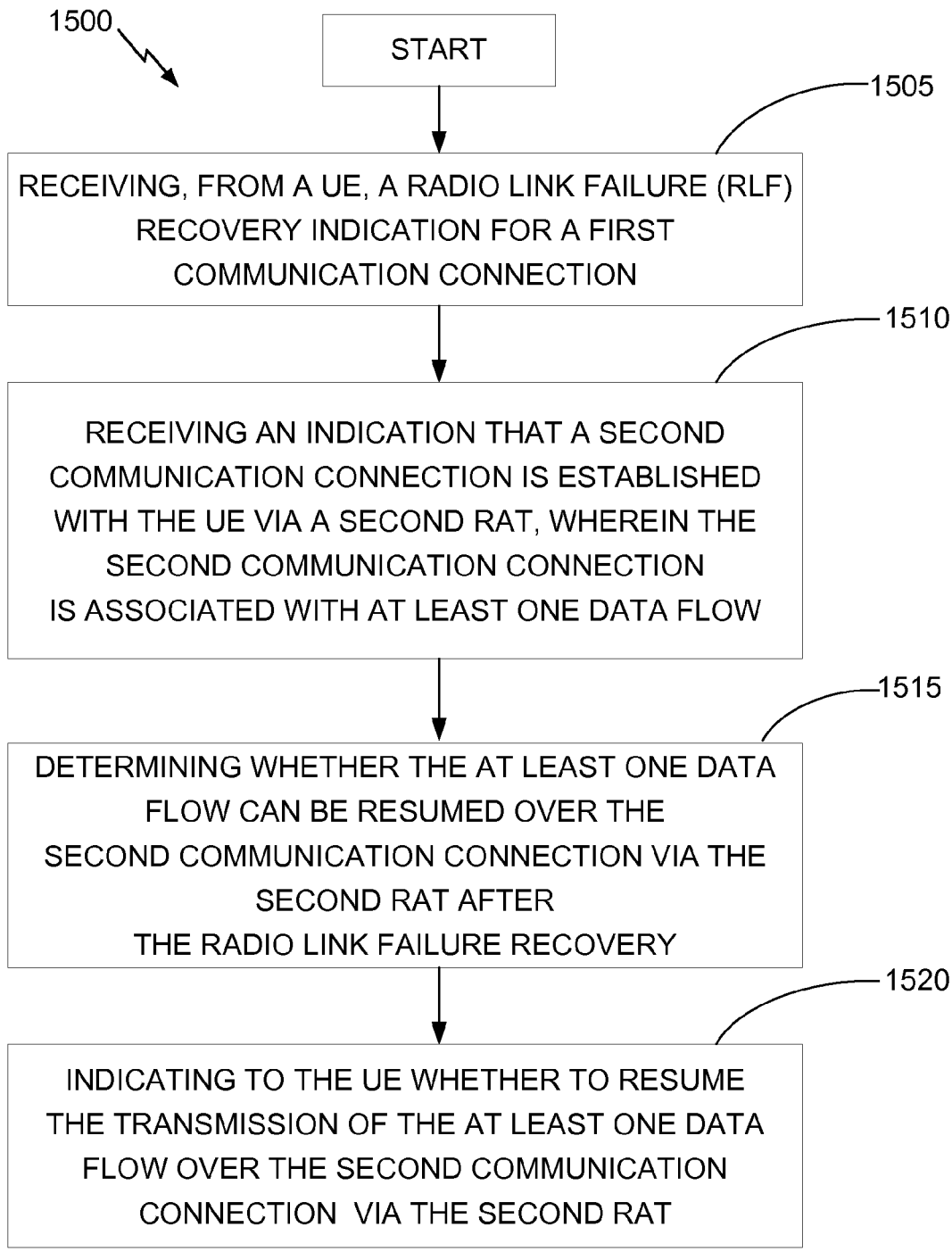
FIG. 15 is a block diagram illustrating a method for managing radio link failure recovery at a user equipment by a second eNodeB as described herein.

Referring to FIG. 15, a method 1500 for managing radio link failure recovery at a user equipment may be performed by a second eNodeB, which may be, for example, one of eNodeBs 110 of FIG. 1, eNodeB 205 of FIG. 2, eNodeB 310 of FIG. 3, eNodeB 405-*a* of FIG. 4, eNodeB 505-*a* of FIGS. 5A and 5B, and eNodeB 605-*a* of FIGS. 6-12. For simplicity, the aspects of method 1500 are described as being performed by eNodeB 605-*a* in communication with UE 615 and/or WLAN AP 605-*b*, as generally illustrated by FIG. 6. In the example of method 1500, eNodeB 605-*a* handles the RLF recovery of UE 615. The first eNodeB described as performing the aspects of method 1400 may or may not be the same as the second eNodeB described as performing the aspects of method 1500.

At 1505, the method 1500 includes receiving, from a user equipment, a radio link failure recovery indication for a first communication connection. For example, eNodeB 605-*a* receives an indication that UE 615 is recovering from LTE RLF.

At 1510, the method 1500 includes receiving an indication that a second communication connection is established with the user equipment via a second RAT, wherein the second communication connection is associated with at least one data flow. For example, eNodeB 605-*a* receives an indication from UE 615 that it is in communication with WLAN AP 605-*b* over WLAN radio link 662 and that WLAN data flows are being transmitted by UE 615 to WLAN AP 605-*b*.

At 1515, the method 1500 includes determining whether the at least one data flow can be resumed over the second communication connection via the second RAT after the radio link failure recovery. For example, RLF data flow configuration component 610 of eNodeB 605-*a* may be configured to determine whether WLAN data flows may be resumed over WLAN after the UE 615 recovers from RLF.

At 1520, the method 1500 includes indicating to the user equipment whether to resume the transmission of the at least one data flow over the second communication connection via the second RAT. For example, eNodeB 605-*a* may be configured to indicate to UE 615 (e.g., via configuration 654) whether to resume transmission of the WLAN data flows over WLAN.

According to the first, second, third, fourth, and sixth aspects, the method 1500 optionally includes receiving at least one measurement report related to the second RAT (e.g., WLAN), and determining whether the UE 615 can resume the transmission of the at least one data flow (e.g., WLAN data flow) over the second RAT based at least in part on the at least one measurement report.

According to some aspects, the method 1500 optionally includes receiving a plurality of indications, each of which indicates whether the UE 615 suspended the transmission of a particular one of the at least one data flow (e.g., WLAN data flows) over the second RAT during RLF, wherein each of the plurality of indications is associated with a particular one of the at least one data flow (e.g., WLAN data flows) over the second RAT. Further, the method 1500 optionally includes receiving, from UE 615, at least one measurement report related to the second RAT (e.g., WLAN measurement report), detecting that the first communication connection (e.g., LTE) has been reestablished, and determining whether to resume transmissions over the second RAT (e.g., WLAN) based on the at least one measurement report. In one example, the measurement report(s) may be transmitted as part of an RRC Connection Reestablishment message.

According to some aspects, the method 1500 optionally includes receiving a further indication that the transmission of the at least one data flow (e.g., LTE data flows) over the second RAT were maintained during RLF, detecting that the first communication connection (e.g., LTE) has been reestablished, and determining whether to transmit the at least one data flow (e.g., LTE data flows), which was maintained over the second RAT (e.g., WLAN) during RLF, over the first RAT (e.g., LTE). In one example, the further indication may be a measurement report related to the second RAT (e.g., a WLAN measurement report), which may be, for example, transmitted as part of an RRC Connection Reestablishment message.

Figure 16:
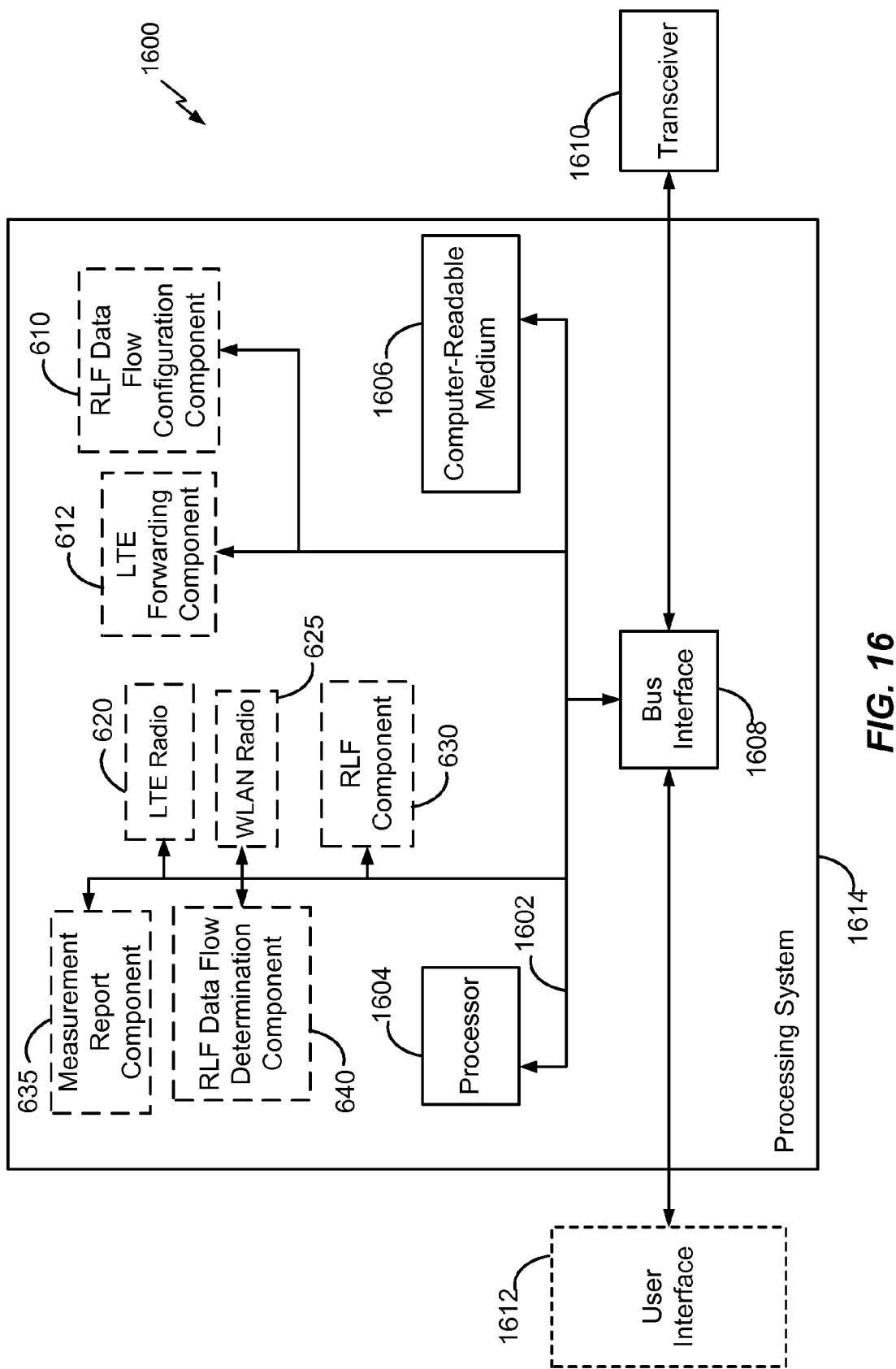
FIG. 16 is a diagram illustrating an example of a hardware implementation for an apparatus employing a processing system having aspects configured to manage radio link failure recovery for a user equipment as described herein.

Referring to FIG. 16, an example of a hardware implementation for an apparatus 1600 employing a processing system 1614 having aspects configured for allocating user equipment processing capability among multiple access nodes as described herein is shown. In this example, the processing system 1614 may be implemented with a bus architecture, represented generally by the bus 1602. The bus 1602 may include any number of interconnecting buses and bridges depending on the specific application of the processing system 1614 and the overall design constraints. The bus 1602 links together various circuits including one or more processors, represented generally by the processor 1604 and computer-readable media, represented generally by the computer-readable medium 1606. In an aspect where the apparatus 1600 employing processing system 1614 is, for example, eNodeB 605-*a*, the bus 1602 also links RLF data flow configuration component 610. In an aspect where the apparatus 1600 employing processing system 1614 is, for example, WLAN AP 605-*b*, the bus 1602 also links WWAN forwarding component 612. In an aspect where the apparatus 1600 employing processing system 1614 is, for example, UE 615, the bus 1602 also links RLF component 630, measurement report component 635, RLF data flow determination component 640, WWAN radio 620, and WLAN radio 625. It should be noted that transceiver 1610 may be a part of WWAN radio 620 and WLAN radio 625, and vice versa. The bus 1602 may also link various other circuits such as timing sources, peripherals, voltage regulators, and power management circuits, which are well known in the art, and therefore, will not be described any further. It should be understood that any aspect of FIG. 16 may be implemented by hardware, software, and/or a combination thereof. In one example, any of the operations or functions that the apparatus of FIG. 16 is configured to support may be implemented using the processor 1604 and/or the computer-readable medium 1606.

A bus interface 1608 provides an interface between the bus 1602 and a transceiver 1610. The transceiver 1610 provides a means for communicating with various other apparatus over a transmission medium. Depending upon the nature of the apparatus, a user interface 1612 (e.g., keypad, display, speaker, microphone, joystick) may also be provided.

The processor 1604 is responsible for managing the bus 1602 and general processing, including the execution of software stored on the computer-readable medium 1606. The software, when executed by the processor 1604, causes the processing system 1614 to perform the various functions described herein related to allocating user equipment processing capability among multiple access nodes for any particular apparatus. The computer-readable medium 1606 may also be used for storing data that is manipulated by the processor 1604 when executing software.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM□, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for managing a radio link failure recovery, comprising:
   establishing communication with a first radio access technology and a second radio access technology;
   transmitting at least one data flow over the first radio access technology and at least one data flow over the second radio access technology;
   detecting a radio link failure between a user equipment and the first radio access technology; and
   determining whether to maintain the at least one data flow over the second radio access technology when the radio link failure is detected.

2. The method of claim 1, wherein the first radio access technology is associated with a wireless wide area network (WWAN) and the at least one data flow is at least one of a bearer, a traffic flow template (TFT), a transmission control protocol (TCP) connection, or a quality of service (QoS) class.

3. The method of claim 1, wherein the WWAN is a Long-Term Evolution (LTE) network or a Universal Mobile Telecommunication System (UMTS).

4. The method of claim 1, wherein determining whether to maintain the at least one data flow over the second radio access technology comprises determining to suspend a transmission of one or more data flows of the at least one data flow over the second radio access technology, and further comprising suspending the transmission of the one or more data flows over the second radio access technology.

5. The method of claim 4, further comprising:
   detecting a recovery from the radio link failure; and
   resuming the transmission of the one or more suspended data flows over the second radio access technology in response to detecting the recovery.

6. The method of claim 4, further comprising:
   detecting a recovery from the radio link failure; and
   resuming the transmission of the one or more suspended data flows over the first radio access technology in response to detecting the recovery.

7. The method of claim 4, further comprising:
   detecting a recovery from the radio link failure;
   receiving a configuration associated with the recovery from the first radio access technology; and
   resuming the transmission of the one or more suspended data flows over the second radio access technology based on the configuration.

8. The method of claim 7, further comprising:
   transmitting information related to the second radio technology to the first radio access technology,
   wherein receiving the configuration from the first radio access technology is in response to transmitting the information related to the second radio technology.

9. The method of claim 8, wherein the information comprises a measurement report.

10. The method of claim 8, wherein the information comprises a plurality of indications, each of which indicates whether the user equipment suspended the transmission for a particular one of the at least one data flow over the second radio access technology during the radio link failure, wherein each of the plurality of indications is associated with a particular one of the at least one data flow over the second radio access technology.

11. The method of claim 8, wherein the information comprises a plurality of indications, each of which indicates whether the user equipment is to resume the transmission for a particular one of the at least one data flow over the first radio access technology or the second radio access technology, wherein each of the plurality of indications is associated with a particular one of the at least one data flow over the first radio access technology.

12. The method of claim 1, wherein the determining comprises determining to maintain the transmission of the at least one data flow over the second radio access technology.

13. The method of claim 1, wherein the determining is based on at least one of a network configuration received at the user equipment, an access network discovery and selection function (ANDSF) policy, a quality of service (QoS) parameter, or an implementation of the user equipment.

14. The method of claim 1, further comprising transmitting control signaling over the second radio access technology during the radio link failure.

15. The method of claim 14, wherein the control signaling comprises one or both of radio resource control signaling or non-access stratum signaling.

16. The method of claim 1, further comprising receiving control signaling over the second radio access technology during the radio link failure.

17. The method of claim 16, wherein the control signaling comprises one or both of radio resource control signaling or non-access stratum signaling.

18. A non-transitory computer readable medium storing computer-executable code, comprising:
   code for causing at least one computer to establish communication with a first radio access technology and a second radio access technology;
   code for causing the at least one computer to transmit at least one data flow over the first radio access technology and at least one data flow over the second radio access technology;
   code for causing the at least one computer to detect a radio link failure between a user equipment and the first radio access technology; and
   code for causing the at least one computer to determine whether to maintain the at least one data flow over the second radio access technology when the radio link failure is detected.

19. An apparatus for managing a radio link failure recovery, comprising:
   means for establishing communication with a first radio access technology and a second radio access technology;
   means for transmitting at least one data flow over the first radio access technology and at least one data flow over the second radio access technology;
   means for detecting a radio link failure between a user equipment and the first radio access technology; and
   means for determining whether to maintain the at least one data flow over the second radio access technology when the radio link failure is detected.

20. An apparatus for managing a radio link failure recovery, comprising:
   a controller configured to establish communication with a first radio access technology and a second radio access technology;
   a wireless wide area network (WWAN) radio configured to transmit at least one data flow over the first radio access technology;
   a wireless local area network (WLAN) radio configured to transmit at least one data flow over the second radio access technology;

a radio link failure (RLF) component configured to detect a radio link failure between a user equipment and the first radio access technology; and an RLF data flow determination component configured to determine whether to maintain the at least one data flow over the second radio access technology when the radio link failure is detected.

21. A method for managing a radio link failure recovery, comprising:
    establishing a first communication connection with a user equipment via a first radio access technology;
    receiving an indication that a second communication connection is established with the user equipment via a second radio access technology, wherein the second communication connection transmits at least one data flow;
    receiving, after a radio link failure of the first communication connection, a radio link failure recovery indication of the first communication connection from the user equipment;
    determining whether the at least one data flow can be maintained over the second communication connection via the second radio access technology during a radio link failure; and
    indicating to the user equipment whether to maintain the transmission of the at least one data flow, on a per-data flow basis, over the second communication connection via the second radio access technology.

22. The method of claim 21, wherein the establishing results from the user equipment moving from an idle state to a connected state or from the user equipment being handed over.

23. The method of claim 21, wherein the indicating comprises sending at least one of a configuration message or a data message to the user equipment.

24. The method of claim 23, wherein the configuration message is a radio resource control message.

25. The method of claim 23, wherein the sending comprises sending at least one of a configuration message or a data message to the user equipment over the second communication connection via the second radio access technology.

26. A non-transitory computer-readable medium storing computer-executable code, comprising:
    code for causing at least one computer to establish a first communication connection with a user equipment via a first radio access technology;
    code for causing the at least one computer to receive an indication that a second communication connection is established with the user equipment via a second radio access technology, wherein the second communication connection transmits at least one data flow;
    code for causing the at least one computer to receive, after a radio link failure of the first communication connection, a radio link failure recovery indication of the first communication connection from the user equipment;
    code for causing the at least one computer to determine whether the at least one data flow can be maintained over the second communication connection via the second radio access technology during a radio link failure; and
    code for causing the at least one computer to indicate to the user equipment whether to maintain the transmission of the at least one data flow, on a per-data flow basis, over the second communication connection via the second radio access technology.

27. An apparatus for managing a radio link failure recovery, comprising:
    means for establishing a first communication connection with a user equipment via a first radio access technology;
    means for receiving an indication that a second communication connection is established with the user equipment via a second radio access technology, wherein the second communication connection transmits at least one data flow;
    means for receiving, after a radio link failure of the first communication connection, a radio link failure recovery indication of the first communication connection from the user equipment;
    means for determining whether the at least one data flow can be maintained over the second communication connection via the second radio access technology during a radio link failure; and
    means for indicating to the user equipment whether to maintain the transmission of the at least one data flow, on a per-data flow basis, over the second communication connection via the second radio access technology.

28. An apparatus for managing a radio link failure recovery, comprising:
    at least one memory; and
    a radio link failure (RLF) data flow configuration component, in communication with the at least one memory, and configured to:
        establish a first communication connection with a user equipment via a first radio access technology;
        receive an indication that a second communication connection is established with the user equipment via a second radio access technology, wherein the second communication connection transmits at least one data flow;
        receive, after a radio link failure of the first communication connection, a radio link failure recovery indication of the first communication connection from the user equipment;
        determine whether the at least one data flow can be maintained over the second communication connection via the second radio access technology during a radio link failure; and
        indicate to the user equipment whether to maintain the transmission of the at least one data flow, on a per-data flow basis, over the second communication connection via the second radio access technology.

29. A method for managing a radio link failure recovery, comprising:
    receiving, from a user equipment, a radio link failure recovery indication for a first communication connection;
    receiving an indication that a second communication connection is established with the user equipment via a second radio access technology, wherein the second communication connection is associated with at least one data flow;
    determining whether the at least one data flow can be resumed over the second communication connection via the second radio access technology after the radio link failure recovery; and
    indicating to the user equipment whether to resume the transmission of the at least one data flow over the second communication connection via the second radio access technology.

30. The method of claim 29, further comprising:
    receiving at least one measurement report related to the second radio access technology; and determining whether the user equipment can resume the transmission of the at least one data flow over the second radio access technology based at least in part on the at least one measurement report.

31. The method of claim 29, further comprising:
receiving a plurality of indications, each of which indicates whether the user equipment suspended the transmission of a particular one of the at least one data flow over the second radio access technology during the radio link failure, wherein each of the plurality of indications is associated with a particular one of the at least one data flow;
receiving, from the user equipment, at least one measurement report related to the second radio access technology;
detecting that the first communication connection has been reestablished; and
determining whether to resume transmissions over the second radio access technology based on the at least one measurement report and in response to the detecting.

32. The method of claim 31, wherein the at least one measurement report is received as part of a Radio Resource Control (RRC) Connection Reestablishment message.

33. The method of claim 32, further comprising:
receiving a further indication that the transmission of the at least one data flow over the second radio access technology was maintained during the radio link failure;
detecting that the first communication connection has been reestablished; and
determining whether to transmit the at least one data flow, which was maintained over the second radio access technology during the radio link failure, over the first radio access technology, in response to the detecting.

34. The method of claim 33, wherein the indication is included in a measurement report related to the second radio access technology.

35. The method of claim 33, wherein the indication is received as part of a Radio Resource Control (RRC) Connection Reestablishment message.

36. A non-transitory computer-readable medium storing computer-executable code, comprising:
code for causing at least one computer to receive, from a user equipment, a radio link failure recovery indication for a first communication connection;
code for causing the at least one computer to receive an indication that a second communication connection is established with the user equipment via a second radio access technology, wherein the second communication connection is associated with at least one data flow;
code for causing the at least one computer to determine whether the at least one data flow can be resumed over the second communication connection via the second radio access technology after the radio link failure recovery; and
code for causing the at least one computer to indicate to the user equipment whether to resume the transmission of the at least one data flow over the second communication connection via the second radio access technology.

37. An apparatus for managing a radio link failure recovery, comprising:
means for receiving, from a user equipment, a radio link failure recovery indication for a first communication connection;
means for receiving an indication that a second communication connection is established with the user equipment via a second radio access technology, wherein the second communication connection is associated with at least one data flow;
means for determining whether the at least one data flow can be resumed over the second communication connection via the second radio access technology after the radio link failure recovery; and
means for indicating to the user equipment whether to resume the transmission of the at least one data flow over the second communication connection via the second radio access technology.

38. An apparatus for managing a radio link failure recovery, comprising:
at least one memory; and
a radio link failure (RLF) data flow configuration component in communication with the at least one memory and configured to:
receive, from a user equipment, a radio link failure recovery indication for a first communication connection;
receive an indication that a second communication connection is established with the user equipment via a second radio access technology, wherein the second communication connection is associated with at least one data flow;
determine whether the at least one data flow can be resumed over the second communication connection via the second radio access technology after the radio link failure recovery; and
indicate to the user equipment whether to resume the transmission of the at least one data flow over the second communication connection via the second radio access technology.

\* \* \* \* \*